(12) United States Patent
Sumasu et al.

(10) Patent No.: US 9,077,472 B2
(45) Date of Patent: Jul. 7, 2015

(54) WIRELESS COMMUNICATION APPARATUS AND WIRELESS COMMUNICATION METHOD

(75) Inventors: Atsushi Sumasu, Kanagawa (JP); Daichi Imamura, Kanagawa (JP); Masayuki Hoshino, Kanagawa (JP); Yasuaki Yuda, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 498 days.

(21) Appl. No.: 13/639,214

(22) PCT Filed: Mar. 23, 2011

(86) PCT No.: PCT/JP2011/001711
§ 371 (c)(1),
(2), (4) Date: Oct. 4, 2012

(87) PCT Pub. No.: WO2011/125300
PCT Pub. Date: Oct. 13, 2011

(65) Prior Publication Data
US 2013/0028217 A1   Jan. 31, 2013

(30) Foreign Application Priority Data
Apr. 5, 2010  (JP) ................. 2010-087197

(51) Int. Cl.
*H04L 5/00* (2006.01)
*H04L 27/26* (2006.01)
(Continued)

(52) U.S. Cl.
CPC ........... *H04J 11/0023* (2013.01); *H04L 5/0023* (2013.01); *H04L 5/0035* (2013.01); *H04L 5/0039* (2013.01); *H04L 5/0048* (2013.01)

(58) Field of Classification Search
CPC . H04L 5/0007; H04L 27/2647; H04W 80/04; H04W 88/06; H04W 28/04; H04W 72/04
USPC .......................................... 370/208, 328, 329
See application file for complete search history.

(56) References Cited

U.S. PATENT DOCUMENTS

2010/0254471 A1*  10/2010  Ko et al. ....................... 375/260

FOREIGN PATENT DOCUMENTS

WO   2009/157168 A1   12/2009

OTHER PUBLICATIONS

"Evaluations on CSI-RS Patterns" 3GPP TSG RAN WG1 meeting, Jan. 2010.

(Continued)

*Primary Examiner* — Ronald B Abelson
(74) *Attorney, Agent, or Firm* — Pearne & Gordon LLP

(57) ABSTRACT

Provided are a wireless communication apparatus and a wireless communication method capable of reducing distortion of a CSI-RS and interference with other CSI-RSs. The wireless communication apparatus according to the invention includes: a CSI-RS generation section that generates CSI-RSs, an arrangement section that arranges the CSI-RSs in a single or a plurality of consecutive OFDM symbols located between a plurality of OFDM symbols, in which a signal other than the CSI-RS is arranged, and adjacent to the plurality of OFDM symbols in which the signal other than the CSI-RS is arranged; and a transmission section that transmits a signal other than the CSI-RS arranged by the arrangement section and a transmission signal including the CSI-RS.

2 Claims, 28 Drawing Sheets

(51) Int. Cl.
*H04W 80/04* (2009.01)
*H04W 88/06* (2009.01)
*H04W 28/04* (2009.01)
*H04W 72/04* (2009.01)
*H04J 11/00* (2006.01)

(56) References Cited

OTHER PUBLICATIONS

"Stage-2 Performance Evaluation: Impacts of CSI-RS Puncturing on Rel-8 PDSCH Demodulation" 3GPP TSG RAN WG1 meeting, Jan. 2010.
"Intra-cell CSI-RS design aspects" 3GPP TSG-RAN WG1 meeting, Nov. 2009.
Huawei et al, CSI-RS simulation assumptions, 3GPP TSG RAN WG1 Meeting #60, R1-101676, Feb. 2010, p. 2 <URL: http://www.3gpp.org/ftp/tsg_ran/WG1_RL1/TSGR1_59b/Docs/R1-101676.zip>.
NTT DOCOM, CSI-RS Inter-cell DEsign Aspects, , 3GPP TSG RAN WG1 Meeting #59bis, R1-100498, Jan. 2010, p. 7 <URL:http://www.3gpp.org/ftp/tsg_ran/WG1_RL1/TSGR1_59B/Docs/R1-100498.zip>.
CATT, Important issues concerning CSI-RS for both FDD and TDD, 3GPP TSG RAN WG1 Meeting #59, R1-094547, Nov. 2009, p. 2 <URL:http://www.3gpp.org/ftp/tsg_ran/WG1_RL1/TSGR1_59/Docs/R1-094547.zip>.
Pantech, Inter-cell CSI-RS Pattern Design for LTA-A, 3GPP TSG RAN WG1 Meeting #60, R1-100990, Feb. 2010, p. 3 <URL:http://www.3gpp.org/ftp/tsg_ran/WG1_RL1/TSGR1_60/Docs/R1-100990.zip>.
Motorola, Views on intercell aspects of CSI-RS design, 3GPP TSG RAN1 #60, R1-101463, Feb. 2010, p. 1-3 <URL: http://www.3gpp.org/ftp/tsg_ran/WG1_RL1/TSGR1_60/Docs/R1-101463.zip>.
International Search Report for Application No. PCT/JP2011/001711 dated May 10, 2011.

* cited by examiner

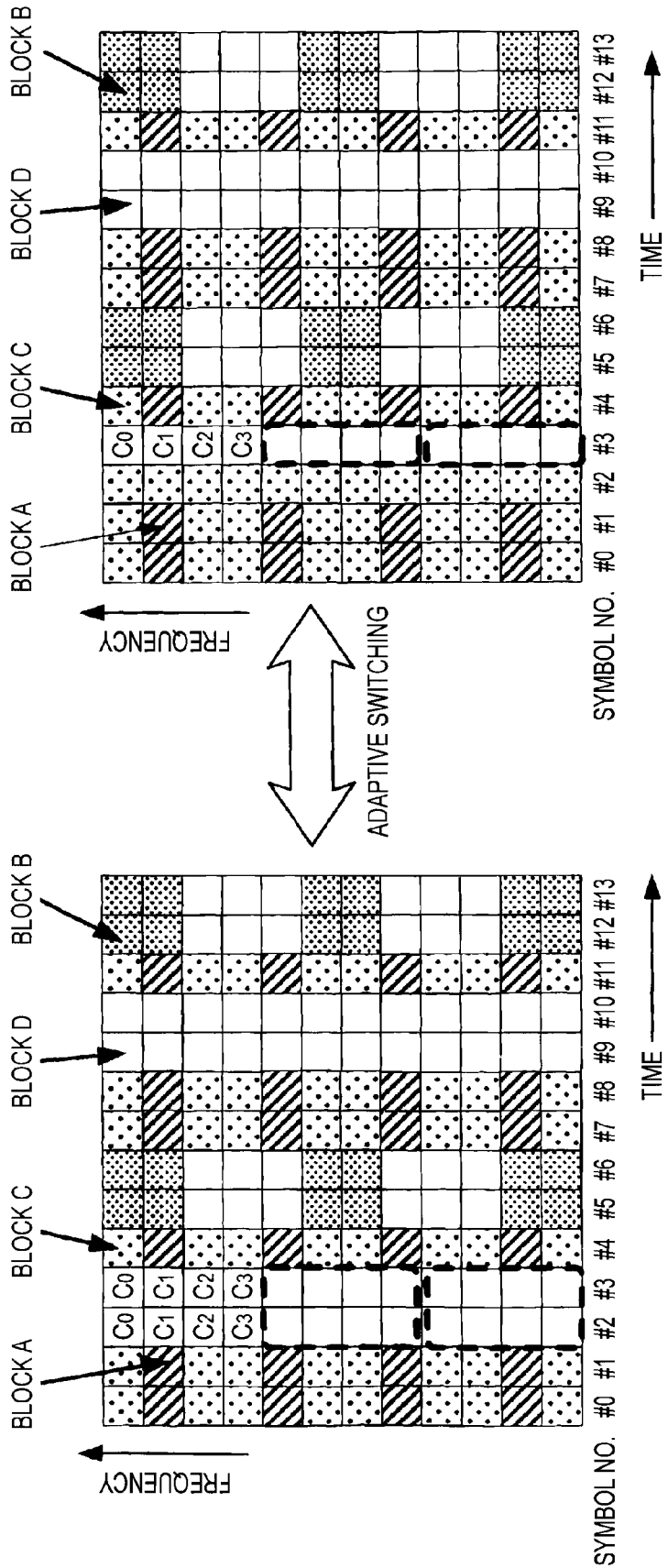

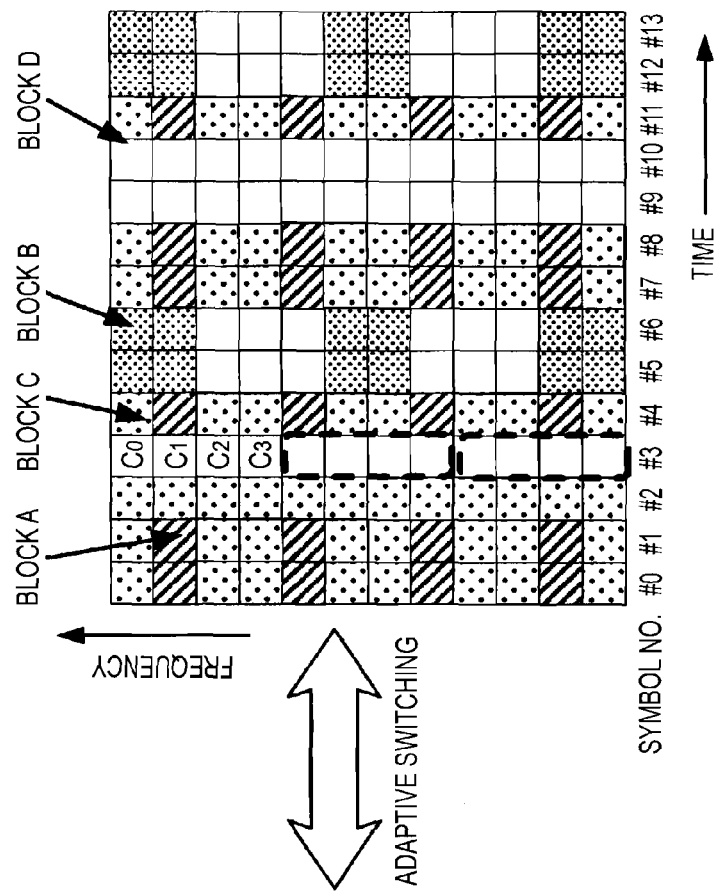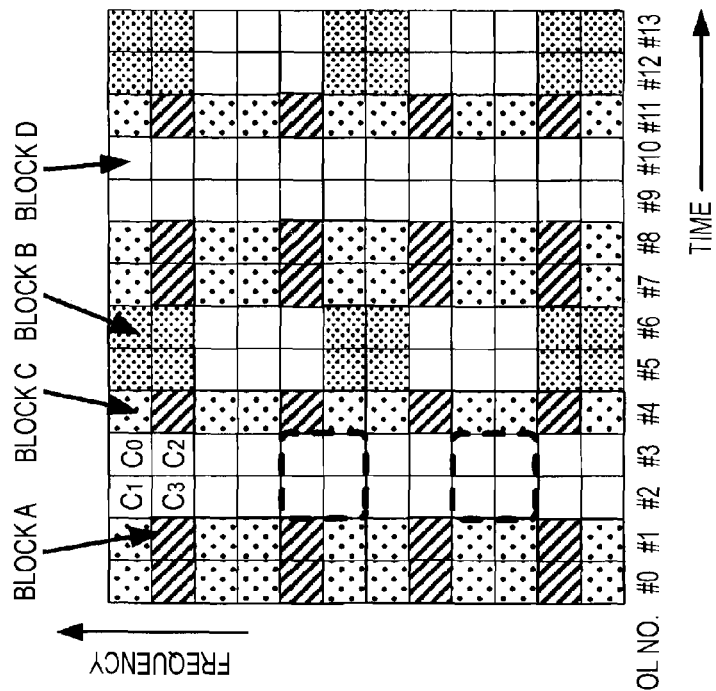

4 PORTS
RAN1 #60 SIMULATION ASSUMPTION

PATTERN 1

PATTERN 2

PATTERN 3

PATTERN 4

PATTERN 5

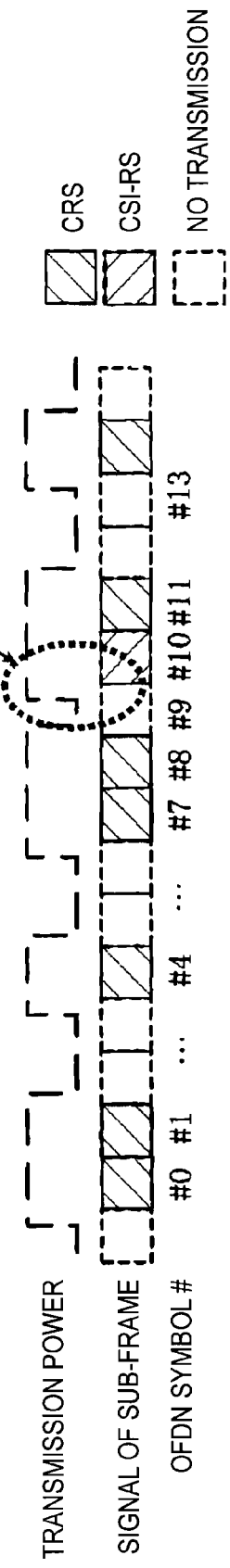

WIRELESS COMMUNICATION APPARATUS AND WIRELESS COMMUNICATION METHOD

TECHNICAL FIELD

The present invention relates to a wireless communication apparatus and a wireless communication method, and more particularly, to a wireless communication apparatus and a wireless communication method capable of performing coordinated transmission of CoMP.

BACKGROUND ART

Currently, ITU-R (International Telecommunication Union-Radio communication sector) has established IMT (International Mobile Telecommunication)-Advanced scheme. In 3GPP (3rd Generation Partnership Project), LTE-Advanced (LTE-A) of improving a system performance has been standardized while maintaining backward compatibility with Rel. 8 LTE (Release 8 Long Term Evolution).

In RAN1, coordinated multi-point transmission and reception (CoMP) of controlling a transmission power or a transmission base station between multiple base stations based on a change in an instantaneous interference power has been examined only for the LTE-A. Further, a pilot signal (CSI-RS: Channel State Information-Reference Signal) for estimating downstream space information has been examined to realize the CoMP. The transmission base station that supports the CoMP is assumed to transmit the CSI-RS.

FIG. 22 is a diagram illustrating an exemplary pattern (R1-101676), which is a simulation assumption agreed in RAN1 #60, when up to three cells can be multiplexed with four antenna ports. In FIG. 22, the vertical axis represents a frequency and the horizontal axis represents a time. Further, one sub-frame is formed by fourteen OFDM symbols of OFDM symbols #0 to #13 shown along the horizontal axis. In the exemplary pattern shown in FIG. 22, the CSI-RS is transmitted with OFDM symbol #10 (see NPL 1).

FIGS. 23 to 27 are diagrams illustrating a plurality of exemplary patterns when up to five cells can be multiplexed with eight antenna ports. The exemplary patterns shown in FIGS. 23 to 27 are exemplary patterns slightly corrected from exemplary patterns (R1-100498) (see NPL 2). In FIGS. 23 to 27, the vertical axis represents a frequency and the horizontal axis represents a time. Further, one sub-frame is formed by fourteen OFDM symbols of OFDM symbols #0 to #13 shown along the horizontal axis. In regard to regions partitioning the OFDM symbols, as shown in FIGS. 23 to 27, each block A (indicated by diagonal lines) refers to a resource region with which a CRS (Cell-specific Reference Signal) is likely to be transmitted, each block B (indicated by dense dots) refers to a DMRS (DeModulation Reference Signal) region, each block C (indicated by sparse dots) refers to a region with which a PDCCH (Physical Downlink Control CHannel) is likely to be transmitted, and each block D (indicated by a blank) refers to a region with which the CSI-RS is likely to be arranged. In the exemplary arrangements shown in FIGS. 23 to 27, up to three cells can be multiplexed with four antenna ports.

In Pattern 1 shown in FIG. 23, the CSI-RSs from a 0-th antenna port to a 3rd antenna port are transmitted with OFDM symbol #4, the CSI-RSs from a 4th antenna port to a 7th antenna port are transmitted with OFDM symbol #11. Pattern 2 shown in FIG. 24, the CSI-RSs from a 0-th antenna port to a 3rd antenna port are transmitted with OFDM symbol #4, the CSI-RSs from a 4th antenna port to a 7th antenna port are transmitted with OFDM symbol #11. In Pattern 3 shown in FIG. 25, the CSI-RSs from a 0-th antenna port to a 3rd antenna port are transmitted with OFDM symbol #4, and the CSI-RSs from a 4th antenna port to a 7th antenna port are transmitted with OFDM symbol #11.

Further, in Pattern 4 shown in FIG. 26, the CSI-RSs from a 0-th antenna port to a 3rd antenna port are transmitted with OFDM symbol #5, the CSI-RSs from a 4th antenna port to a 7th antenna port are transmitted with OFDM symbol #12. Likewise, in Pattern 5 shown in FIG. 27, the CSI-RSs from a 0-th antenna port to a 3rd antenna port are transmitted with OFDM symbol #5, the CSI-RSs from a 4th antenna port to a 7th antenna port are transmitted with OFDM symbol #12.

CITATION LIST

Non Patent Literature

[NPL 1] R1-101676 "CSI-RS simulation assumptions"
[NPL 2] R1-100498 "CSI-RS Inter-cell Design Aspects"

SUMMARY OF INVENTION

Technical Problem

When a signal to be transmitted is not present, a base station turns off a power amplifier (hereinafter, also referred to as a PA). However, a signal is distorted in a rise time and a fall time when the PA is turned on/off. When user data to be transmitted with a downlink is not required to be transmitted, that is, a PDSCH is not required to be transmitted, a base station transmits a CSI-RS from a state where a transmission signal is not present. In this case, since a CSI-RS signal is distorted due to a change in a transmission power, the reception signal quality of the CSI-RS may deteriorate. Further, since unnecessary interference occurs due to the change in the transmission power, the quality of another CSI-RS may deteriorate.

FIG. 28 is a schematic diagram illustrating a temporal change in the transmission power when the CSI-RS is transmitted. As shown in the schematic diagram of FIG. 28, the CSI-RS is assumed to be transmitted with a sub-frame with which only a CRS is transmitted. In FIG. 28, the CRS is transmitted with OFDM symbols #0, #1, #4, #7, #8, and #11 and the CSI-RS is transmitted with OFDM symbol #10. A dashed line shown in FIG. 28 indicates the level of a transmission level. FIG. 28 shows the symbols as Simulation Assumption by R1-101676.

When a transmission signal is not present with OFDM symbol #9 immediately before OFDM symbol #10, as in FIG. 28, the PA is turned off and the level of the transmission power of the PA is thus lowered. Then, the level of the transmission power of the PA rises to transmit the CSI-RS with OFDM symbol #10. As a result, a considerable change in the transmission power occurs in OFDM symbol #9 immediately before OFDM symbol #10. The change in the transmission power results in distortion of the CSI-RS signal. As a result, the reception signal quality of a mobile terminal may deteriorate. Further, the change in the transmission power causes unnecessary interference to occur, and thus affects a CSI-RS transmitted from another base station.

However, a mobile terminal needs to receive the CSI-RS of all the base stations that are likely to perform coordinated transmission of CoMP and estimate space information. Therefore, unlike other signals that may arrive only at the range of a normal cell, the CSI-RS has to be transmitted not only to a cell of a base station with high quality but also to neighborhood cells. Accordingly, for the CSI-RS required to have high quality, the adverse influence caused by rise and fall of the PA may produce a disastrous result for space information estimation in an own cell and neighborhood cells.

An object of the invention is to provide a wireless communication apparatus and a wireless communication method capable of reducing distortion of a CSI-RS and interference to other CSI-RSs.

Solution to Problem

According to the invention, there is provided a wireless communication apparatus including: a CSI-RS generation section that generates a CSI-RS, an arrangement section that arranges the CSI-RS in a single or a plurality of consecutive OFDM symbols located between a plurality of OFDM symbols in which a signal other than the CSI-RS is arranged, and adjacent to the plurality of OFDM symbols in which the signal other than the CSI-RS is arranged; and a transmission section that transmits a signal other than the CSI-RS arranged by the arrangement section and a transmission signal including the CSI-RS.

In the wireless communication apparatus, the signal other than the CSI-RS includes a reference signal, a data signal, and a control signal.

In the wireless communication apparatus, the arrangement section arranges the CSI-RS in the single or the plurality of consecutive OFDM symbols adjacent to an OFDM symbol in which a CRS is arranged.

In the wireless communication apparatus, the arrangement section arranges the CSI-RS in a region other than a DMRS region among the single OFDM symbol or the plurality of consecutive OFDM symbols adjacent to the OFDM symbols in which the signal other than the CSI-RS is arranged.

In the wireless communication apparatus, the CSI-RS generation section copies a plurality of CSI-RSs in a time direction, and the arrangement section arranges the plurality of CSI-RSs copied in the time direction in the single OFDM symbol or the plurality of consecutive OFDM symbols adjacent to the OFDM symbols in which the signal other than CSI-RS is arranged.

The wireless communication apparatus further includes a CRS generation section that generates a plurality of CRSs corresponding to a plurality of antenna ports. The CSI-RS generation section generates a plurality of CSI-RSs corresponding to the plurality of antenna ports. The arrangement section arranges the plurality of CSI-RSs in the single OFDM symbol or the plurality of consecutive OFDM symbols adjacent to OFDM symbols in which the plurality of CRSs are arranged.

In the wireless communication apparatus, the CSI-RS generation section performs code-multiplexing by multiplying the plurality of CSI-RSs spread in the time direction by an orthogonal code.

In the wireless communication apparatus, the CSI-RS generation section generates a plurality of CSI-RSs corresponding to the plurality of antenna ports, copies the plurality of CSI-RSs corresponding to the plurality of antenna ports in the time direction when PDCCHs included in the control signal are arranged from a beginning of a sub-frame to two OFDM symbols, and generates the plurality of CSI-RSs corresponding to the plurality of antenna ports without copying the plurality of CSI-RSs in the time direction when the PDCCHs are arranged from the beginning of the sub-frame to three OFDM symbols. The arrangement section arranges the plurality of CSI-RSs in the single OFDM symbol or the plurality of consecutive OFDM symbols adjacent to the OFDM symbols in which the PDCCHs are arranged.

In the wireless communication apparatus, the CSI-RS generation section generates a plurality of CSI-RSs corresponding to the plurality of antenna ports, performs code-multiplexing by spreading the plurality of CSI-RSs corresponding to the plurality of antenna ports in the time direction and multiplying the plurality of CSI-RSs by an orthogonal code when PDCCHs included in the control signal are arranged from a beginning of a sub-frame to two OFDM symbols, and generates the plurality of CSI-RSs corresponding to the plurality of antenna ports without copying the plurality of CSI-RSs in the time direction when the PDCCHs are arranged from the beginning of the sub-frame to three OFDM symbols. The arrangement section arranges the plurality of CSI-RSs in the single OFDM symbol or the plurality of consecutive OFDM symbols adjacent to the OFDM symbols in which the PDCCHs are arranged.

According to the invention, there is provided a base station including the wireless communication apparatus.

According to the invention, there is provided a wireless communication apparatus including a reception section that receives a signal including a CSI-RS and CSI-RS arrangement information indicating that the CSI-RS is arranged in a single OFDM symbol or a plurality of consecutive OFDM symbols continuous to an OFDM symbol in which a signal other than the CSI-RS is arranged; a demultiplexing section that demultiplexes the CSI-RS from the signal based on the CSI-RS arrangement information received by the reception section; and a space information generation section that generates a space estimation information of a line between the own wireless communication apparatus and another communication apparatus communicating with the own wireless communication apparatus from the CSI-RS.

According to the invention, there is provided a mobile apparatus including the wireless communication apparatus.

According to the invention, there is provided a wireless communication method including: generating a CSI-RS, arranging the CSI-RS in a single OFDM symbol or a plurality of consecutive OFDM symbols adjacent to an OFDM symbol in which a signal other than the CSI-RS is arranged; and transmitting the signal other than the CSI-RS and a transmission signal including the arranged CSI-RS.

Advantageous Effects of Invention

The wireless communication apparatus and the wireless communication method according to the invention are capable of reducing the distortion of the CSI-RS and the interference to other CSI-RSs.

BRIEF DESCRIPTION OF DRAWINGS

FIGS. 18(*a*) and 18(*b*) are schematic diagrams illustrating exemplary arrangements of CSI-RSs according to a fourth embodiment.

FIGS. 19(*a*) and 19(*b*) are schematic diagrams illustrating other exemplary arrangements of CSI-RSs according to the fourth embodiment.

FIG. 28 is a schematic diagram illustrating a time change in a transmission power when a CSI-RS is transmitted.

DESCRIPTION OF EMBODIMENTS

Hereinafter, embodiments of the invention will be described with reference to the drawings.
(First Embodiment)
FIG. 1 is a diagram schematically illustrating an exemplary arrangement of CSI-RSs according to a first embodiment.

Figure 1:
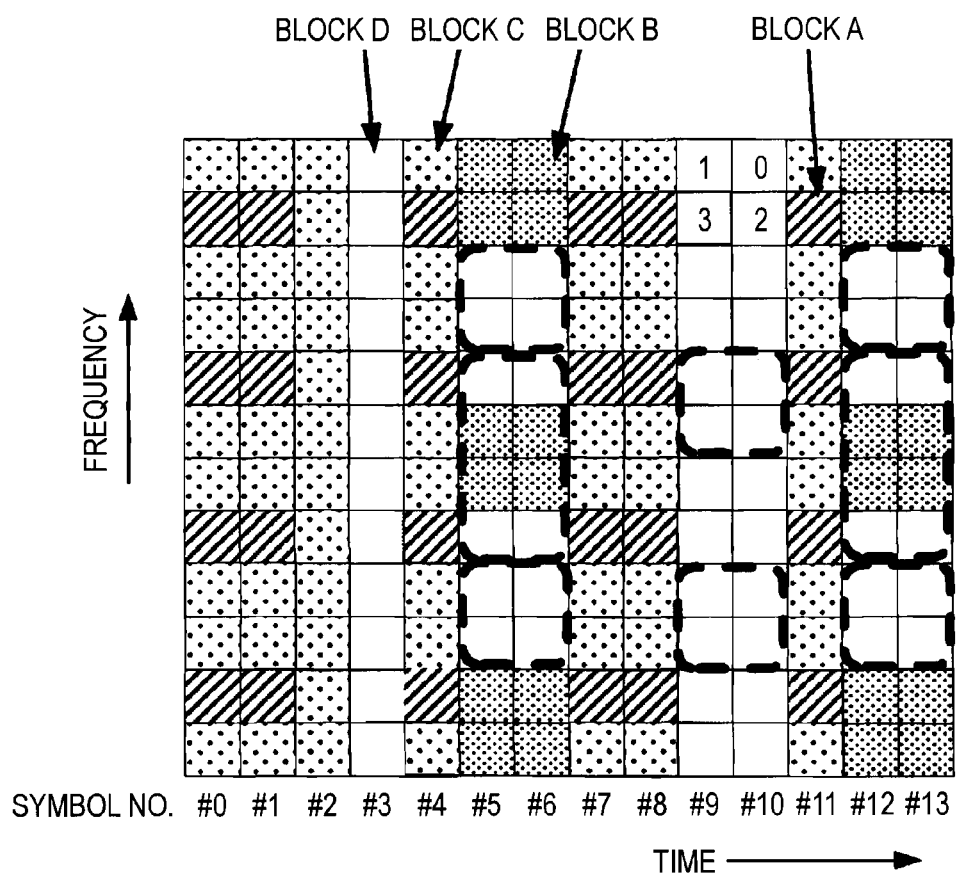
FIG. 1 is a diagram illustrating an exemplary arrangement of CSI-RSs according to a first embodiment.
Figure 22:
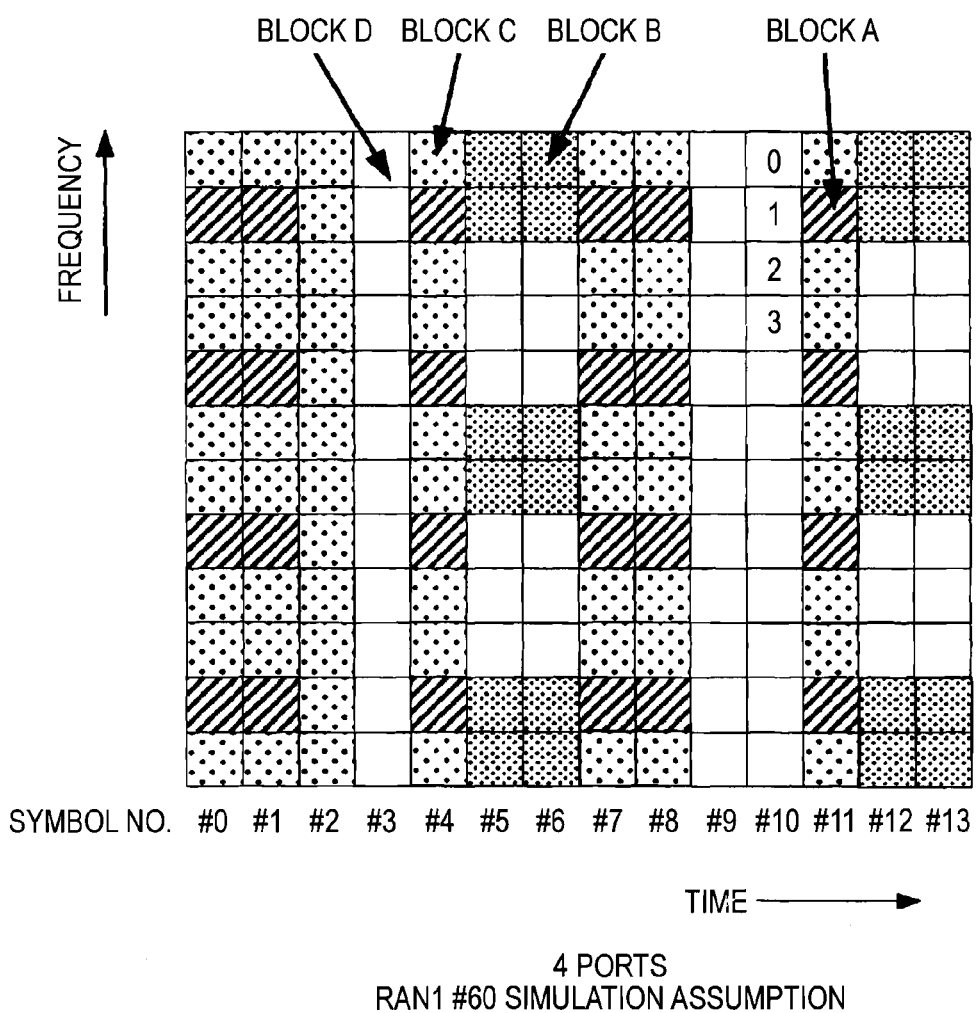
FIG. 22 is a diagram illustrating Simulation Assumption agreed in RAN1 #60.
Figure 23:
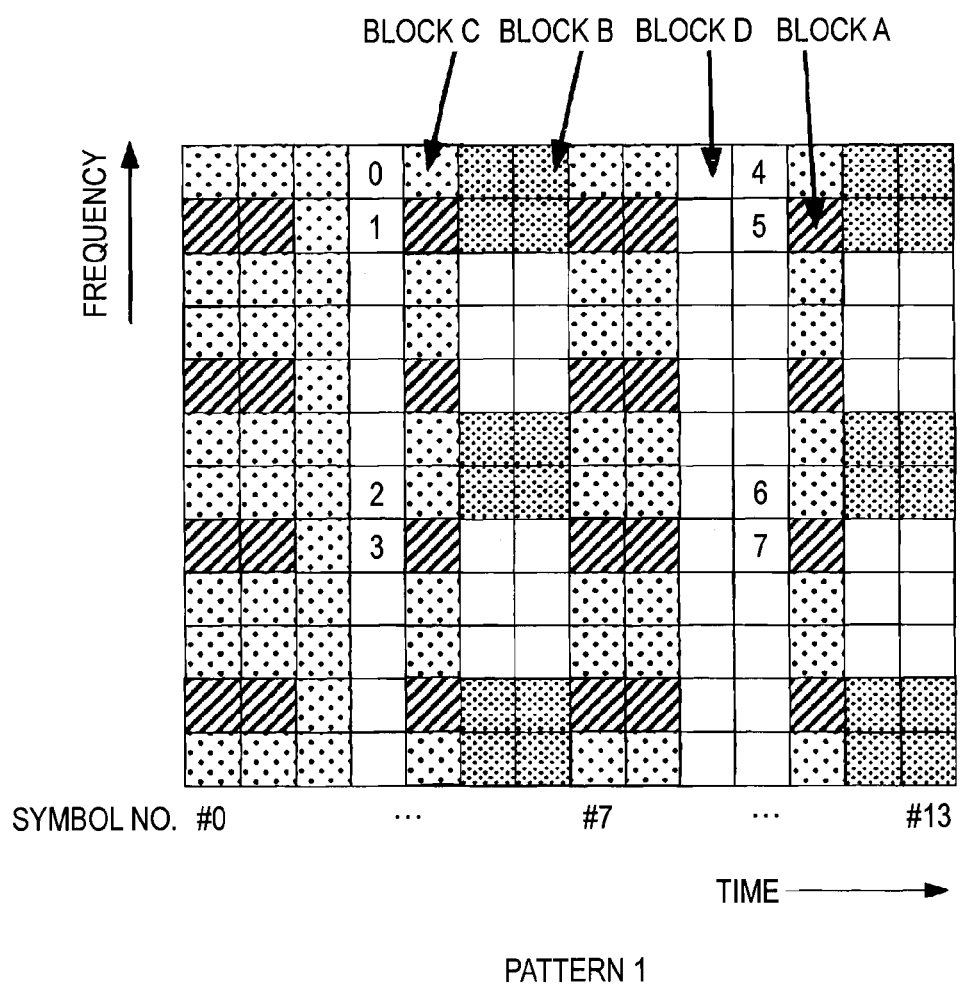
FIG. 23 is a diagram illustrating Pattern 1 when up to five cells are multiplexed with eight antenna ports.
Figure 24:
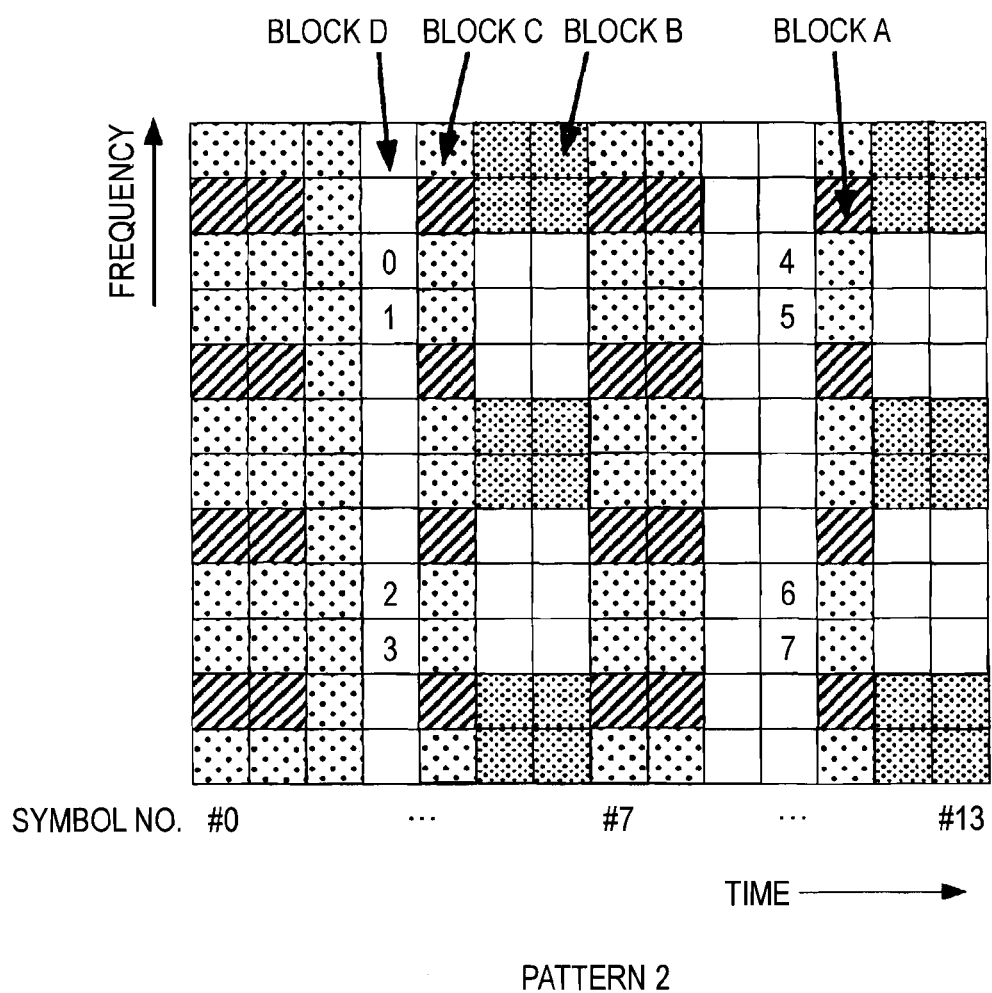
FIG. 24 is a diagram illustrating Pattern 2 when up to five cells are multiplexed with eight antenna ports.
Figure 25:
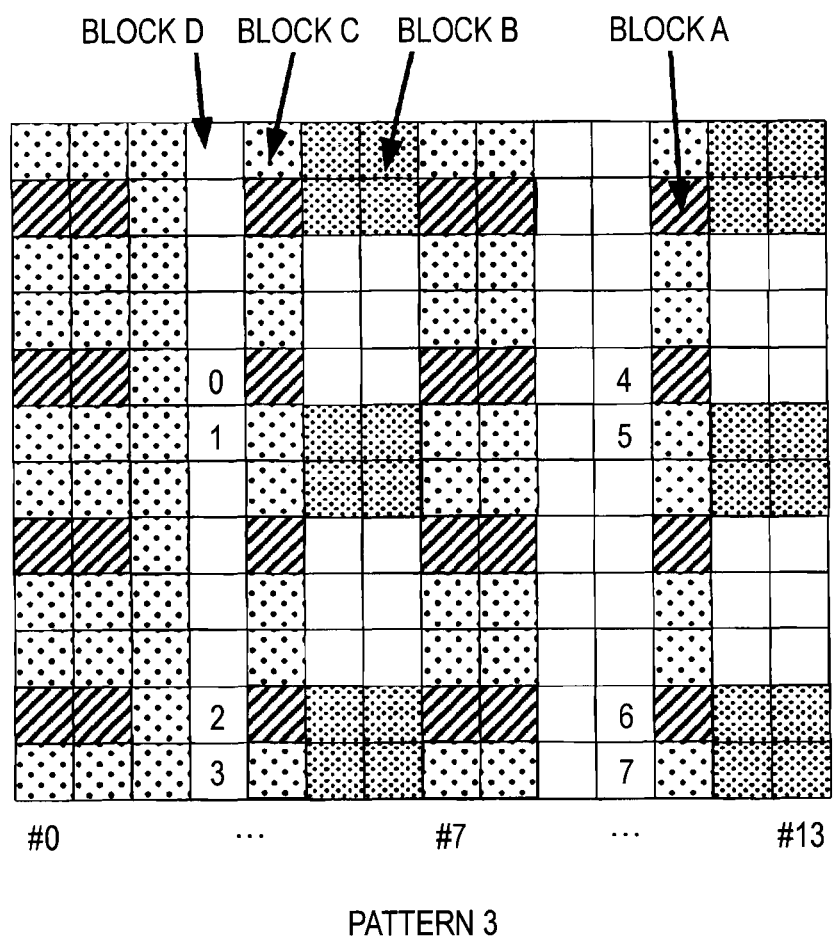
FIG. 25 is a diagram illustrating Pattern 3 when up to five cells are multiplexed with eight antenna ports.
Figure 26:
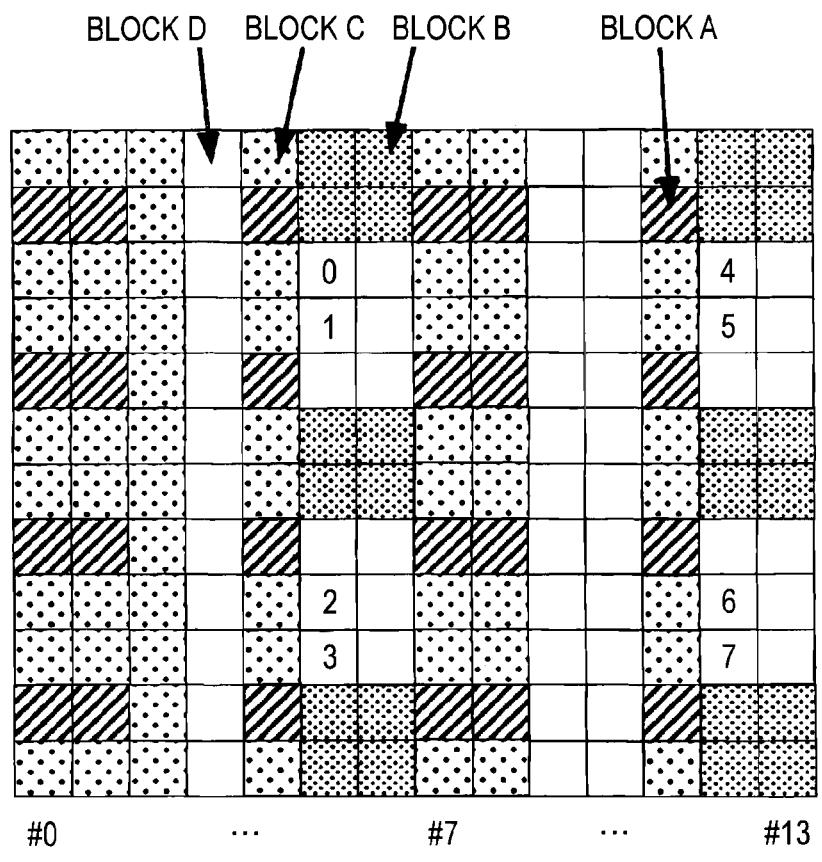
FIG. 26 is a diagram illustrating Pattern 4 when up to five cells are multiplexed with eight antenna ports.
Figure 27:
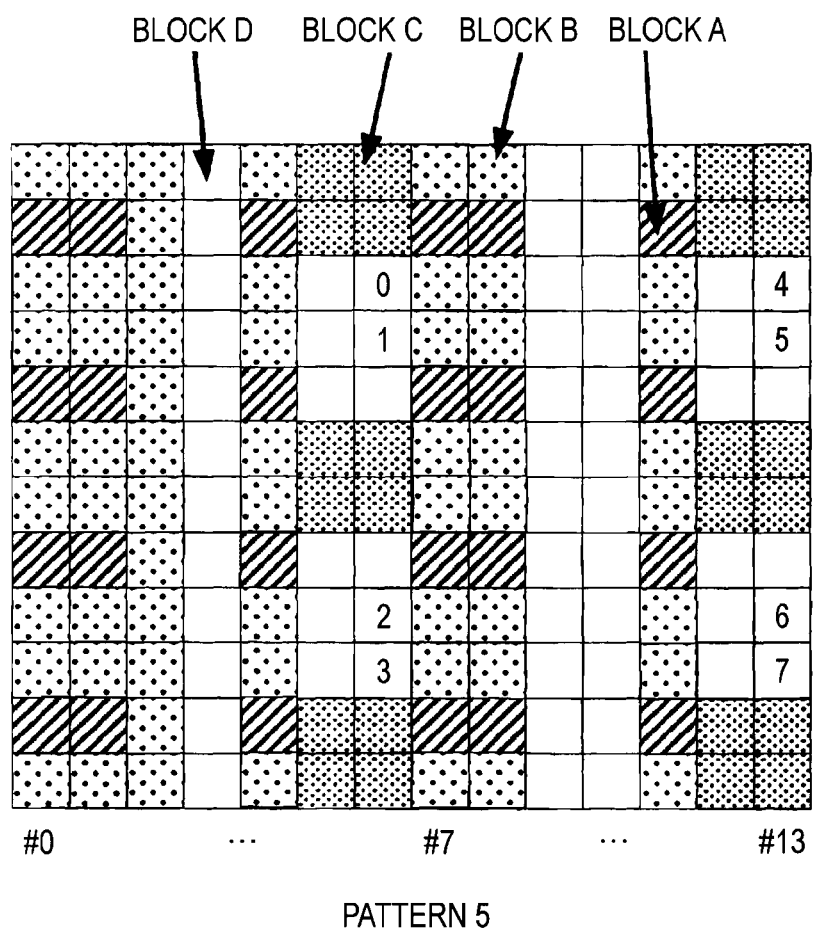
FIG. 27 is a diagram illustrating Pattern 5 when up to five cells are multiplexed with eight antenna ports.

In FIG. 1, the vertical axis represents a frequency and the horizontal axis represents a time. One sub-frame is formed by fourteen OFDM symbols of OFDM symbols #0 to #13 shown along the horizontal axis. In regard to regions partitioning the OFDM symbols, as shown in FIG. 1, a block A (indicated by diagonal lines) refers to a resource region with which a CRS is likely to be transmitted, a block B (indicated by dense dots) refers to a DMRS region, a block C (indicated by sparse dots) refers to a region with which a PDCCH is likely to be transmitted, and a block D (indicated by a blank) refers to a region with which the CSI-RS is likely to be arranged. In the exemplary arrangement shown in FIG. 1, up to three cells can be multiplexed with four antenna ports, as in FIG. 22.

The exemplary arrangement shown in FIG. 1, CSI-RSs for each antenna port are arranged in OFDM symbols #9 and #10. The CSI-RSs for antenna port numbers 1 and 3 are arranged in OFDM symbol #9 and the CSI-RSs for antenna port numbers 0 and 2 are arranged in OFDM symbols #10. When the CSI-RS for each antenna port is arranged, CRSs are transmitted before and after OFDM symbols #9 and #10 with which the CSI-RSs are transmitted, as in FIG. 1. Therefore, a change in a transmission power is suppressed before and after OFDM symbols #9 and #10 with which the CSI-RSs are transmitted. Accordingly, the CSI-RS symbol is not distorted when a PA is turned on/off and interference to other CSI-RSs caused due to the distortion of the CSI-RS or occurrence of unnecessary radio waves can be reduced, compared to a case in which the CSI-RS for each antenna port is arranged only in OFDM symbol #10.

Further, in the exemplary arrangement shown in FIG. 1, the CSI-RSs to be transmitted to other base stations in the neighborhood of the own apparatus, which is a target of the CoMP, can be arranged in the region of the block D among the regions surrounded by dashed lines.

As shown in FIG. 1, the CSI-RS for each antenna port may be arranged in OFDM symbols #5 and #6 other than a DMRS region. Further, the CSI-RS for each antenna port may be arranged in OFDM symbols #12 and #13 other than the DMRS region. Accordingly, the CSI-RS symbol is not distorted when the PA is turned on/off and interference to other CSI-RSs caused due to the distortion of the CSI-RS or occurrence of unnecessary radio waves can be reduced by arranging the CSI-RS for each antenna port, compared to a case in which the CSI-RS for each antenna port is arranged only in OFDM symbol #10.

Next, a temporal transition of the transmission power in the exemplary arrangement shown in FIG. 1 will be described with reference to FIGS. 2(*a*) and 2(*b*). To make the comparison, FIG. 2(*a*) is a diagram schematically illustrating the temporal transition of the transmission power when the CSI-RS for each antenna port is transmitted with OFDM symbol #10. Further, FIG. 2(*b*) is a diagram schematically illustrating the temporal transition of the transmission power in the exemplary arrangement shown in FIG. 1.

Figure 2:
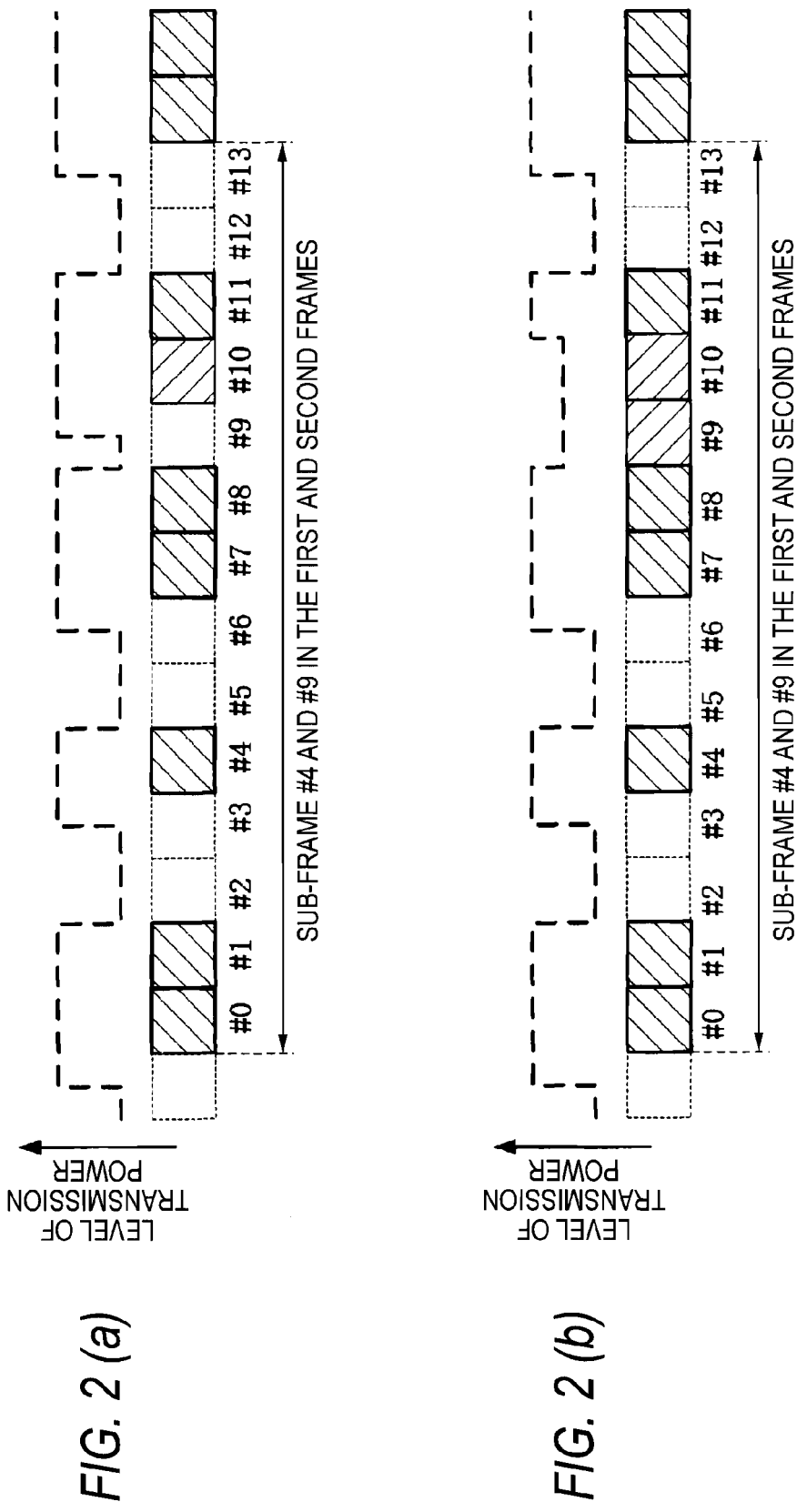
FIG. 2(a) is a schematic diagram illustrating a temporal transition of a transmission power when a CSI-RS for each antenna port is transmitted with OFDM symbol #10 and FIG. 2(b) is a schematic diagram illustrating a temporal transmission of the transmission power in an exemplary arrangement of the CSI-RSs shown in FIG. 1.

In FIGS. 2(*a*) and 2(*b*), the CSI-RS is assumed to be transmitted in a sub-frame with which only the CRS is transmitted. One sub-frame is formed by fourteen OFDM symbols of OFDM symbol #0 to OFDM symbol #13 shown along the horizontal axis of each drawing. Dashed lines shown in FIGS. 2(*a*) and 2(*b*) indicate the level of a transmission power. In FIGS. 2(*a*) and 2(*b*), up to three cells can be multiplexed with four antenna ports, as in FIG. 1.

In FIG. 2(*a*), the CRSs are transmitted with OFDM symbols #0, #1, #4, #7, #8, and #11 and the CSI-RS is transmitted with OFDM symbol #10. Therefore, the level of the transmission power is considerably changed in OFDM symbol #9 immediately before OFDM symbol #10 with which the CSI-RS is transmitted.

In FIG. 2(*b*), on the other hand, the CRSs are transmitted with OFDM symbols #0, #1, #4, #7, #8, and #11 and the CSI-RS transmitted with a single symbol of OFDM symbol #10 shown in FIG. 2(*a*) is multiplexed and transmitted with OFDM symbols #9 and #10. Therefore, the level of the small transmission power can be prevented from being considerably lowered with OFDM symbol #9 immediately before OFDM symbol #10 with which the CSI-RS is transmitted. When the CSI-RS corresponding to four ports are transmitted, as in FIG. 2(b), the number of REs of the CSI-RS per OFDM symbol is half of the number of CRSs. Therefore, when the transmission power corresponding to one RE of the CSI-RS is the same as the transmission power corresponding to one RE of the CRS, a difference of 3 dB occurs between the OFDM symbols with which the CSI-RS and the CRS are transmitted. In the example shown in FIG. 2(b), however, the change in the level of the transmission power can be prevented from being considerably lowered, compared to the case (see FIG. 2(a)) in which the CSI-RS is focused on the same OFDM symbol.

The invention is not limited to the case shown in FIG. 2(b), but setting of increasing the transmission power corresponding to one RE of the CSI-RS by 3 dB can be sufficiently considered in view of the fact that the CSI-RS is required to be received with high quality even in another cell. When the transmission power of the OFDM symbol with which the CSI-RS is transmitted is the same as the transmission power of the OFDM symbol with which the CRS is transmitted, a change in the level of the transmission power between the OFDM symbol with which the CSI-RS is transmitted and the OFDM symbol with which the CRS is transmitted may be eliminated. Further, the transmission power corresponding to one RE of the CSI-RS may not be increased by 3 dB, but may be increased by 3 dB or more, as necessary. Since the CRS is transmitted necessarily before and after the CSI-RS, the change in the power can be decreased or suppressed.

Further, the invention is not limited to the case shown in FIG. 2(b), but a transmission signal power may be set in the CSI-RS of each antenna port so that the transmission power of the OFDM symbol with which the CSI-RS is transmitted is the same as the transmission power of the total transmission power of the OFDM symbols adjacent to this OFDM symbol. Further, the transmission signal power may be set in the CSI-RS so that the entire transmission power for the CSI-RS transmitted with a single OFDM symbol is the same as the entire transmission power for the CRS transmitted with the OFDM symbols adjacent to this OFDM symbol.

Temporal continuity with the OFDM symbol with which the CRSs are transmitted can be ensured by transmitting the CSI-RSs with OFDM symbols #5 and #6 or OFDM symbols #12 and #13. However, there is a probability that the DMRS is transmitted with OFDM symbols #5 and #6 or OFDM symbols #12 and #13. Therefore, when the CSI-RSs are transmitted with OFDM symbols #5 and #6 or OFDM symbols #12 and #13, decreasing the power set in the CSI-RSs is supposed to suppress a temporal power change in OFDM symbols #5 and #6 or OFDM symbols #12 and #13. Accordingly, the CSI-RS may be arranged preferentially in OFDM symbols #9 and #10, with which other reference signals or control signals are not likely to be transmitted, as resources in which the CSI-RSs are arranged.

Here, in the example shown in FIG. 1, the CSI-RSs of the even antenna port numbers and the CSI-RSs of the odd antenna port numbers are multiplexed in different OFDM symbols. That is, in the example shown in FIG. 1, OFDM symbol #10 in which the CSI-RSs of even antenna port numbers 0 and 2 are multiplexed is different from OFDM symbol #9 in which the CSI-RS of odd antenna port numbers 1 and 3 are multiplexed. This is because abundant CSI-RS are considered to be set by even antenna port numbers, that is, 2, 4, or 8 antenna ports. Therefore, even when any number of antenna ports is used, the CSI-RSs can be arranged necessarily in two OFDM symbols. Further, the transmission powers of the two OFDM symbols can be set to be the same. Accordingly, the change in the transmission power can be eliminated.

The number of antenna ports is supposed to be even in many cases. However, even when the number of antenna ports is odd, the change in the transmission power can be suppressed or decreased by configuring the even antenna ports and odd antenna ports in different OFDM symbols.

Figure 3:
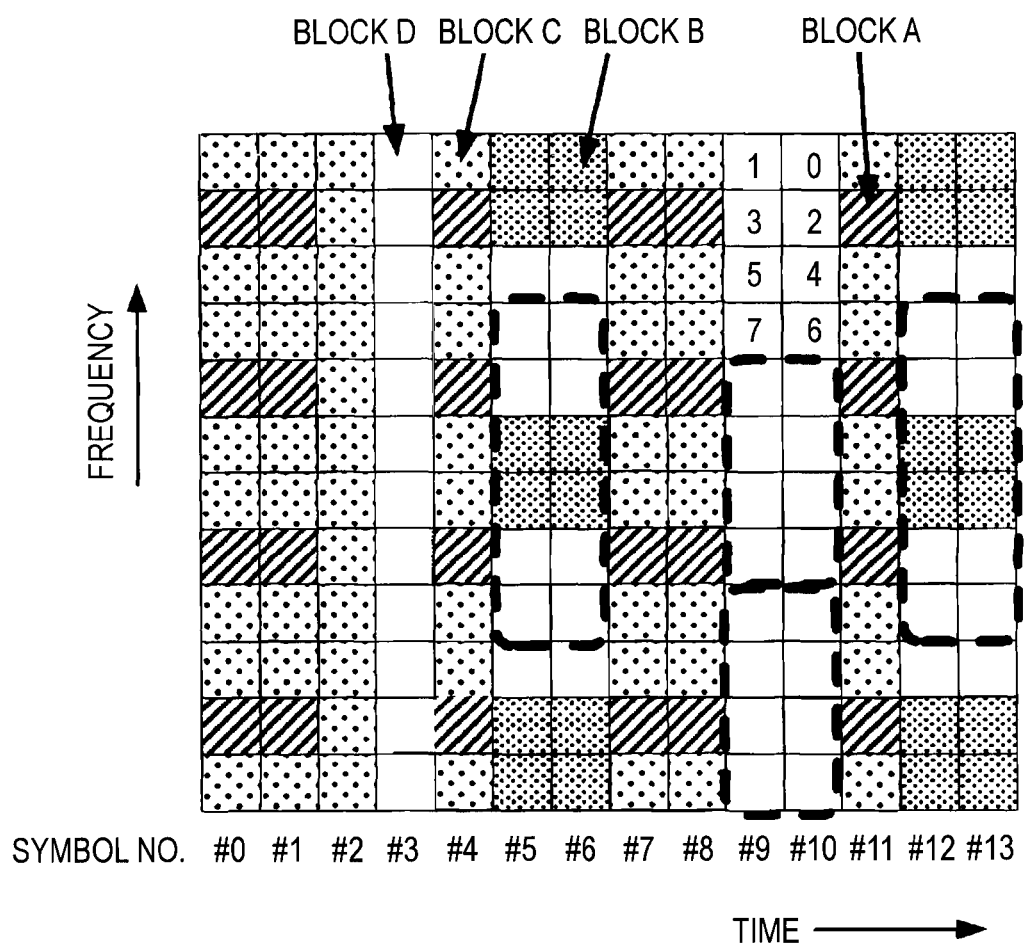
FIG. 3 is a diagram illustrating another exemplary arrangement of the CSI-RSs according to the first embodiment.

Next, another exemplary arrangement of the CSI-RSs according to this embodiment will be described with reference to FIG. 3. FIG. 3 is a diagram schematically illustrating another exemplary arrangement of the CSI-RSs according to this embodiment.

In FIG. 3, the vertical axis represents a frequency and the horizontal axis represents a time. One sub-frame is formed by fourteen OFDM symbols of OFDM symbol #0 to OFDM symbol #13 shown along the horizontal axis. In regard to regions partitioning the OFDM symbols, as shown in FIG. 3, a block A (indicated by diagonal lines) refers to a resource region with which a CRS is likely to be transmitted, a block B (indicated by dense dots) refers to a DMRS region, a block C (indicated by sparse dots) refers to a region with which a PDCCH is likely to be transmitted, and a block D (indicated by a blank) refers to a region with which the CSI-RS is likely to be arranged. In the exemplary arrangement shown in FIG. 3, up to three cells can be multiplexed by eight antenna ports, as in FIG. 1.

In the exemplary arrangement shown in FIG. 3, the CRSs are transmitted by the OFDM symbols #0, #1, #4, #7, #8, and #11 and the CSI-RSs are multiplexed and transmitted with OFDM symbols #9 and #10 corresponding to the eight antenna ports. In particular, OFDM symbol #10 in which the CSI-RSs of even antenna port numbers 0, 2, 4, and 8 are multiplexed is different from the OFDM symbol #9 in which the CSI-RSs of odd antenna port numbers 1, 3, 5, and 7 are multiplexed. Therefore, the transmission powers of the two OFDM symbols of OFDM symbols #9 and #10 can be set to be the same. Further, since the CRSs are transmitted with OFDM symbols #8 and #11 before and after OFDM symbols #9 and #10, it is possible to eliminate the change in the transmission power before and after OFDM symbols #9 and #10 with which the CSI-RSs are transmitted. Further, in the exemplary arrangement shown in FIG. 3, the CSI-RSs to be transmitted to other base stations in the neighborhood of the own apparatus, which is a target of the CoMP, can be arranged in the region of the block D among the regions surrounded by dashed lines.

In the exemplary arrangement shown in FIG. 3, the CSI-RSs may be transmitted with OFDM symbols #5 and #6 or OFDM symbols #12 and #13. Thus, the temporal continuity with the OFDM symbols with which the CRSs are transmitted can be ensured. However, there is a probability that the DMRS (the dark gray blocks in FIG. 3) is transmitted with OFDM symbols #5 and #6 or OFDM symbols #12 and #13. Therefore, when the CSI-RSs are transmitted with OFDM symbols #5 and #6 or OFDM symbols #12 and #13, decreasing the power set in the CSI-RSs is supposed to suppress a temporal power change in OFDM symbols #5 and #6 or OFDM symbols #12 and #13. Accordingly, OFDM symbols #9 and #10, with which other reference signals or control signals are not likely to be transmitted, may be preferred as resources in which the CSI-RSs are arranged.

Accordingly, in the exemplary arrangement shown in FIG. 3, since the change in the transmission power can be eliminated, the CSI-RS signals are not distorted. Further, the reception signal quality in a mobile terminal does not deteriorate. Since the change in the transmission power resulting in occurrence of unnecessary interference can be eliminated, the change in the transmission power does not affect CSI-RSs which another base station transmits.

In the exemplary arrangements shown in FIGS. 1 and 3, the CSI-RSs for each antenna port are adjacent to each other in the frequency direction, but may be demultiplexed from each other in the frequency direction. In this case, the CSI-RSs may be demultiplexed from the CRSs of the same antenna port, as far as possible.

Figure 4:
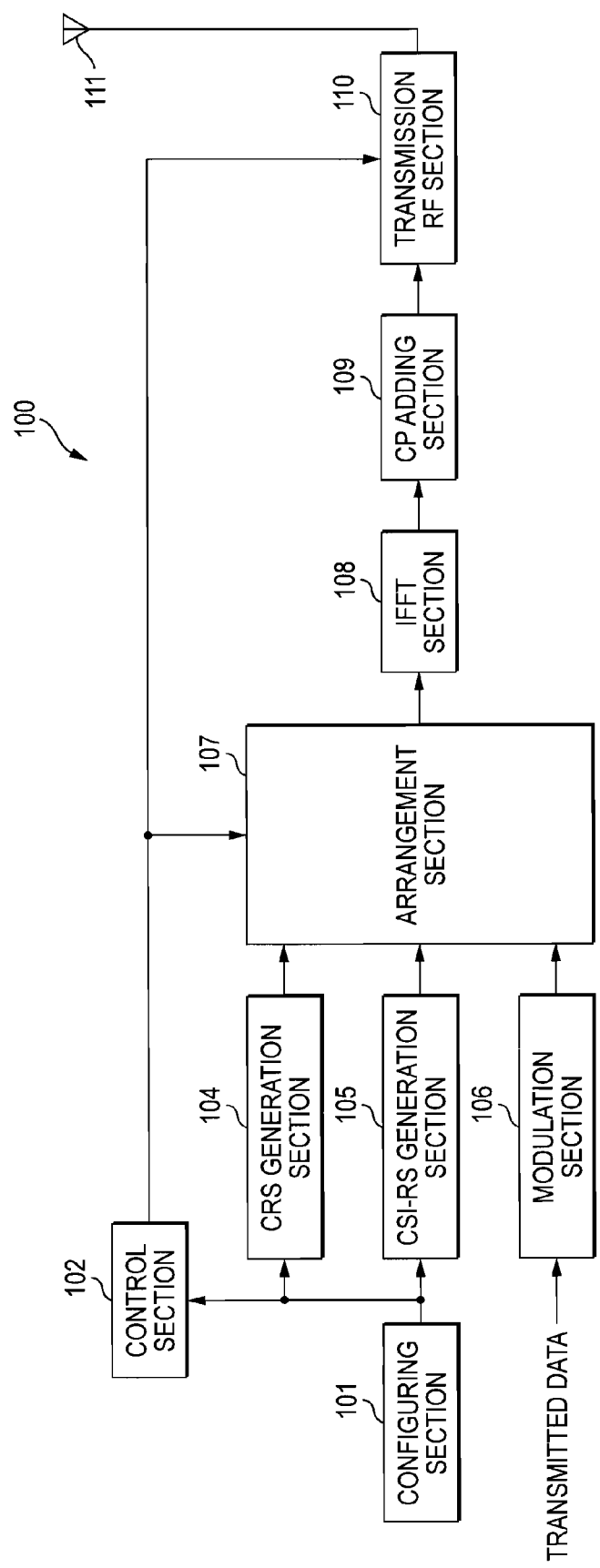
FIG. 4 is a block diagram illustrating the configuration of a base station 100.

Next, a base station 100 will be described as an example of a wireless communication apparatus according to the first embodiment with reference to FIG. 4. FIG. 4 is a block diagram illustrating the configuration of the base station 100. The base station 100 shown in FIG. 4 includes a configuring section 101, a control section 102, a CRS generation section 104, a CSI-RS generation section 105, a modulation section 106, an arrangement section 107, an IFFT section 108, a CP adding section 109, a transmission RF section 110, and an antenna 111.

For example, the configuring section 101 performs configuring so that the CRS is generated. When the CSI-RS is required to be transmitted to support the CoMP, the configuring section 101 configures "configuring information" that includes information indicating generation of the CSI-RS, information indicating the transmission power of the CSI-RS, and information indicating the arrangement of the CSI-RSs. Further, the configuring section 101 outputs the configuring information to the control section 102, the CRS generation section 104, and the CSI-RS generation section 105.

Based on the configuring information input from the configuring section 101, the control section 102 outputs the information indicating the arrangement of the CSI-RSs to the arrangement section 107 so that the information indicating the arrangement of the CSI-RSs is transmitted as a control signal of an upper layer to notify a mobile station 200 of the information indicating the arrangement of the CSI-RSs.

Here, the information indicating the arrangement of the CSI-RSs includes information indicating whether the CSI-RS is present, information indicating a RE in which the CSI-RS is arranged when the CSI-RS is present, information indicating a spreading code when a process such as a spreading process is performed on the CSI-RSs, and information indicating the transmission power of the CSI-RS. According to the information indicating the transmission power of the CSI-RS, the amplitude of the generated CSI-RS signal is adjusted to become a desired transmission power, for example, when power-boosting of increasing the transmission power of the CSI-RS than the signal of another RE is performed. Further, the information indicating the arrangement of the CSI-RS may not be transmitted with each subframe. Further, the information indicating the arrangement of the CSI-RSs may be transmitted as not the control signal of the upper layer but a control signal of a lower physical layer.

The transmission signal power of the CSI-RS is controlled when the CSI-RS generation section 105 generates the CSI-RS. However, when the power adjustment is possible for all of the OFDM symbols, for example, when only the CSI-RSs are transmitted with the OFDM symbol with which the CSI-RS signal is transmitted, the control section 102 may output a transmission power control signal to the transmission RF section 110 to adjust the transmission signal power of the OFDM symbol with which the CSI-RS is transmitted based on the configuring information input from the configuring section 101.

The CRS generation section 104 generates the CRSs based on the configuring information input from the configuring section 101. Then, the CRS generation section 104 outputs the generated CRSs to the arrangement section 107.

The CSI-RS generation section 105 generates the CSI-RSs based on the configuring information input from the configuring section 101. Then, the CSI-RS generation section 105 outputs the generated CSI-RSs to the arrangement section 107.

The modulation section 106 performs channel encoding and modulating on input transmitted data (downlink data) and outputs the modulated data signals to the arrangement section 107.

The arrangement section 107 multiplexes the CRSs input from the CRS generation section 104, the CSI-RSs input from the CSI-RS generation section 105, and the data signal (that is, PDSCH) input from the modulation section 106. Further, when the control information of the upper layer used for the control section 102 to notify the mobile station of the information indicating the arrangement of the CSI-RSs is present, the arrangement section 107 multiplexes this control information with the CRS, the CSI-RS, and the data signal (PDSCH).

Here, the arrangement section 107 arranges (multiplexes) the CRS, the CSI-RS, and the data signal (PDSCH) in each resource block. At this time, the arrangement section 107 arranges (multiplexes) the CRS, the CSI-RS, and the data signal (PDSCH) in each resource block so that the CSI-RS is arranged in the OFDM symbol adjacent before and after the OFDM symbol in which the CRS is arranged. For example, the exemplary arrangements shown in FIGS. 1 and 3 can be considered as the arrangement of the arrangement section 107.

Then, the arrangement section 107 outputs the multiplexed signal to the IFFT (Inverse Fast Fourier Transform) section 108.

The IFFT section 108 performs an IFFT process on the signal input from the arrangement section 107 to obtain a time region signal. Then, the IFFT section 108 outputs the time region signal to the CP (Cyclic Prefix) adding section 109.

The CP adding section 109 adds a CP to the time region signal input from the IFFT section 108 and outputs a signal obtained by adding the CP to the transmission RF (Radio Frequency) section 110.

The transmission RF section 110 performs transmission processes, such as D/A (Digital-to-Analog) conversion, up-conversion, and amplification, on the signal input from the CP adding section 109, and then wirelessly transmits the signal subjected to the transmission processes to the mobile station 200 via the antenna 111.

The base station 100 according to the first embodiment transmits the CSI-RSs with the OFDM symbol adjacent to the OFDM symbol with which the normally transmitted CRS is transmitted. Therefore, it is possible to reduce the number of times the ON/OFF of the OFDM symbol is performed. Further, it is possible to reduce the distortion of the CSI-RS and the interference to other CSI-RSs caused due to the occurrence of unnecessary radio waves.

Figure 5:
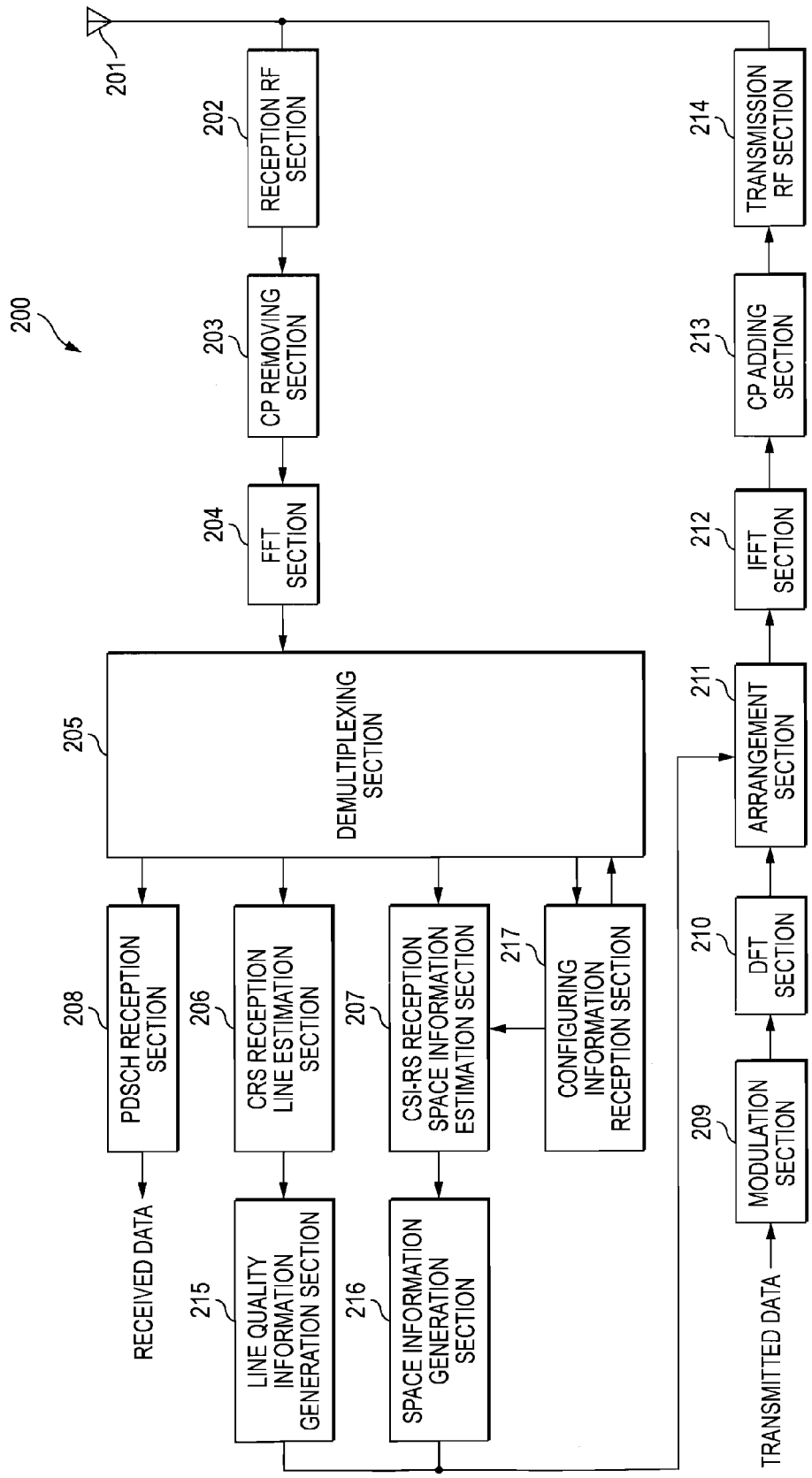
FIG. 5 is a block diagram illustrating the configuration of a mobile station 200.

Next, the configuration of the mobile station 200 communicating with the base station 100 will be described with reference to FIG. 5. FIG. 5 is a block diagram illustrating the configuration of the mobile station 200. The mobile station 200 shown in FIG. 5 includes an antenna 201, a reception RF section 202, a CP removing section 203, an FFT section 204, a demultiplexing section 205, a CRS reception line estimation section 206, a CSI-RS reception space information estimation section 207, a PDSCH reception section 208, a modulation section 209, a DFT section 210, an arrangement section 211, an IFFT section 212, a CP adding section 213, a transmission RF section 214, a line quality information generation section 215, a space information generation section 216, and a configuring information reception section 217.

The reception RF section 202, which is configured to change a reception band, changes the reception band in accordance with a reception signal. The reception RF section 202 performs reception wireless processes (down-conversion, A/D (Analog-to-Digital) conversion, and the like) on a reception wireless signal (here, an OFDM (Orthogonal Frequency Division Multiplex) signal) received via the antenna 201, and then outputs the obtained reception signal to the CP removing section 203.

The CP removing section 203 removes the CP from the reception signal input from the reception RF section 202 and outputs the signal, from which the CP is removed, to the FFT (Fast Fourier Transform) section 204.

The FFT section 204 performs an FFT process on the signal input from the CP removing section 203 to acquire a frequency region signal. Then, the FFT section 204 outputs the frequency region signal to the demultiplexing section 205.

The demultiplexing section 205 demultiplexes the frequency region signal input from the FFT section 204 into the CRS, the CSI-RS, and the data signal (that is, the PDSCH). Based on the configuring information received with the immediately previous sub-frame or the more previous sub-frame, the demultiplexing section 205 outputs the CRS, the CSI-RS, and the PDSCH to the CRS reception line estimation section 206, the CSI-RS reception space information estimation section 207, and the PDSCH reception section 208, respectively. Further, the demultiplexing section 205 outputs the control signal of the upper layer including the configuring information to the configuring information reception section 217.

The configuring information reception section 217 reads the configuring information of the CSI-RS from the control signal input from the demultiplexing section 205, and then outputs the read configuration information to the demultiplexing section 205. Further, the configuring information reception section 217 outputs information on a reverse-spreading code or the like used to receive and demodulate the CSI-RS to the CSI-RS reception space information estimation section 207.

The CRS reception line estimation section 206 estimates a downlink, through which the signal is transmitted from the base station 100 to the own apparatus, based on the CRS input from the demultiplexing section 205 and outputs a line estimation value of the downlink to the line quality information generation section 215.

The line quality information generation section 215 generates line quality information to be reported to the base station 100 based on the line estimation value input from the CRS reception line estimation section 206. The "line quality information" generated here refers to, for example, CQI (Channel Quality Indicator).

The CSI-RS reception space information estimation section 207 performs space information estimation of the downlink, through which the signal is transmitted from the base station 100 to the own apparatus, based on the CSI-RS input from the demultiplexing section 205, referring to the configuring information of the CSI-RS input from the configuring information reception section 217. Then, the CSI-RS reception space information estimation section 207 inputs the space estimation information to the space information generation section 216.

The space information generation section 216 generates space information to be reported to the base station 100 based on the input space estimation information. Further, the space information estimation is performed for not only the base station 100 communicating with the own apparatus but also another base station in the neighborhood of the own apparatus which is the target of the CoMP.

The PDSCH reception section 208 demodulates the PDSCH input from the demultiplexing section 205 to acquire the received data.

The modulation section 209 performs channel encoding and modulating on the input transmitted data (upstream data) and outputs the modulated data signal to the DFT (Discrete Fourier Transform) section 210.

The DFT section 210 performs the FFT process on the data signal input from the modulation section 209 to acquire a frequency region signal. The DFT section 210 outputs the frequency region signal to the arrangement section 211.

The arrangement section 211 arranges the line quality information input from the line quality information generation section 215, the space information input from the space information generation section 216, and the frequency region signal input from the DFT section 210 in upstream resource blocks.

The IFFT section 212 performs an IFFT process on the frequency region signal input from the arrangement section 211 to acquire a time region signal. Then, the IFFT section 212 outputs the time region signal to the CP adding section 213.

The CP adding section 213 adds a CP to the time region signal input from the IFFT section 212 and outputs the signal, to which the CP is added, to the transmission RF section 214.

The transmission RF section 214 performs transmission processes, such as D/A (Digital-to-Analog) conversion, up-conversion, and amplification, on the signal input from the CP adding section 213 and wirelessly transmits the signal subjected to the transmission processes to the base station 100 via the antenna 201.

The mobile station 200 according to the first embodiment demultiplexes the CSI-RSs from the signal which has been transmitted from the base station 100 and in which the CSI-RSs are arranged in the OFDM symbols continuous to the OFDM symbol with which the normally transmitted CRS is transmitted, and then performs the space information estimation of the downlink based on the CSI-RSs. Therefore, the space information to be reported to the base station 100 or a base station in the neighborhood of the target of the CoMP can be generated based on the CSI-RSs with no distortion.

(Second Embodiment)

In the first embodiment, the method of eliminating the change in the transmission power so that the CSI-RS signal is not distorted when the base station 100 is considered as one PA for the plurality of antenna ports or each antenna port is merely a logical antenna and the signal of each logical antenna port is generated and transmitted using all of the physical antenna ports has been described, but the invention is not limited thereto. Accordingly, in a second embodiment, a method of suppressing a change in the transmission power of the base station 200 functioning as a power amplifier (hereinafter, also referred to as a PA) for each of a plurality of antenna ports so that a CSI-RS signal corresponding to each antenna port is not distorted will be described.

FIGS. 6 to 9 are diagrams schematically illustrating exemplary arrangements of the CSI-RSs corresponding to each antenna port according to the second embodiment. In FIGS. 6 to 9, each vertical axis represents a frequency and each horizontal axis represents a time. One sub-frame is formed by fourteen OFDM symbols of OFDM symbol #0 to OFDM symbol #13 shown along the horizontal axis. In regard to regions partitioning the OFDM symbols, as shown in FIGS. 6 to 9, a block A (indicated by diagonal lines) refers to a resource region with which a CRS is likely to be transmitted, a block B (indicated by dense dots) refers to a DMRS region, a block C (indicated by sparse dots) refers to a region with which a PDCCH is likely to be transmitted, and a block D (indicated by a blank) refers to a region with which the CSI-RS is likely to be arranged. In the exemplary arrangements shown in FIGS. 6 to 9, up to three cells can be multiplexed by eight antenna ports, as in FIG. 1. In the exemplary arrangements shown in FIGS. 6 to 9, a region of an OFDM symbol in which the CRS of antenna port number m (where m is a natural number of 0 to 4) is arranged is referred to as a block Rm. Further, a region of an OFDM symbol in which the CSI-RS corresponding to antenna port number m is arranged is referred to as a block Cm.

Figure 6:
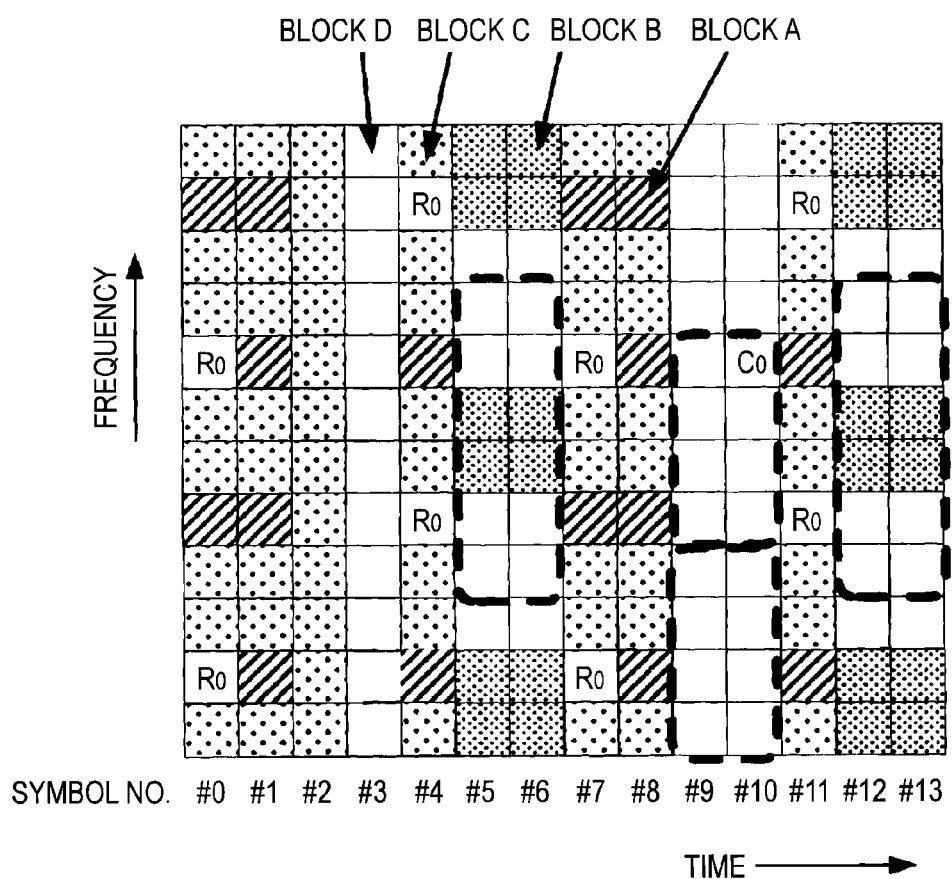
FIG. 6 is a schematic diagram (1) illustrating an exemplary arrangement of CSI-RSs corresponding to antenna port No. 0.

As shown in FIG. 6, blocks $R_0$ are arranged in OFDM symbols #0, #4, #7, and #11 and a block $C_0$ is arranged in OFDM symbol #10. Therefore, OFDM symbol #10 in which the CSI-RS corresponding to antenna port number 0 is arranged is adjacent to OFDM symbol #11 in which the CRS corresponding to antenna port number 0 is arranged. For example, compared to a case in which the block $C_o$ is arranged in OFDM symbol #9, in FIG. 6, it is possible to reduce the number of times the PA is switched between ON and OFF, and thus it is possible to suppress distortion of the CSI-RS caused due to the change in the transmission power. In the exemplary arrangement shown in FIG. 6, the CSI-RS to be transmitted to another base station in the neighborhood of the own apparatus which is the target of the CoMP can be arranged in the region of the block D among the regions surrounded by the dashed lines.

Figure 7:
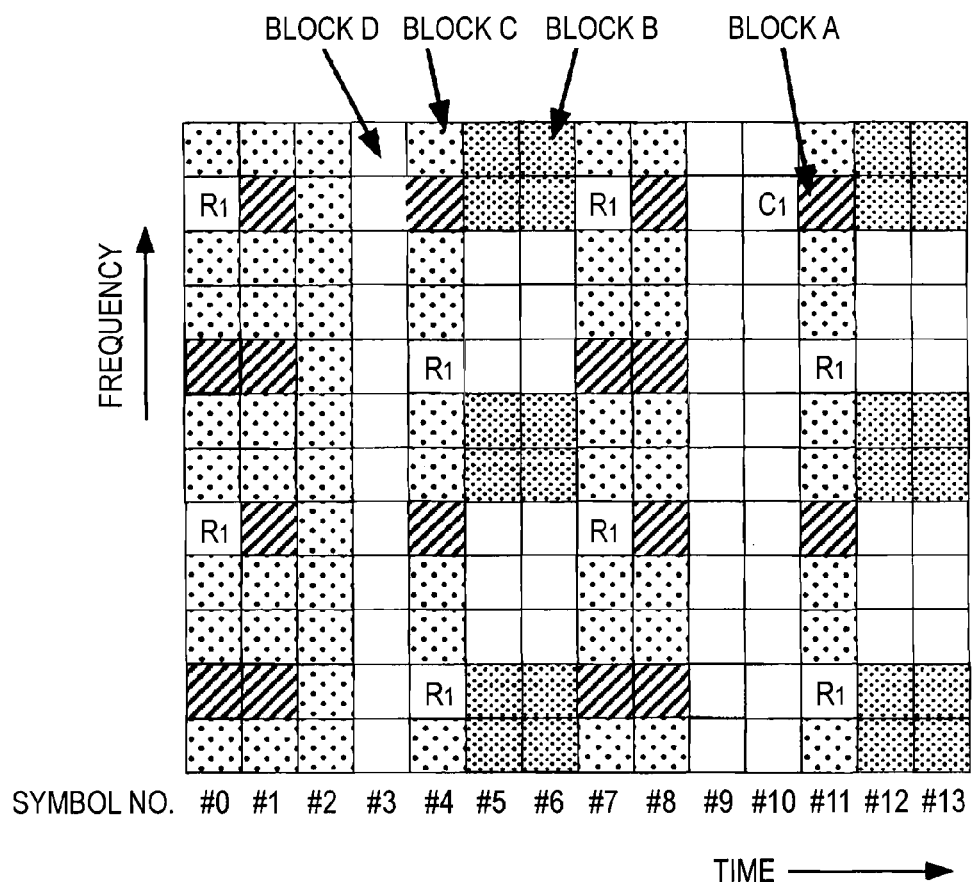
FIG. 7 is a schematic diagram (1) illustrating an exemplary arrangement of CSI-RSs corresponding to antenna port No. 1.

As shown in FIG. 7, blocks $R_1$ are arranged in OFDM symbols #0, #4, #7, and #11 and a block $C_1$ is arranged in OFDM symbol #10. Therefore, OFDM symbol #10 in which the CSI-RS corresponding to antenna port number 1 is arranged is adjacent to OFDM symbol #11 in which the CRS corresponding to antenna port number 1 is arranged. For example, compared to a case in which the block $C_1$ is arranged in OFDM symbol #9, in FIG. 7, it is possible to reduce the number of times the PA is switched between ON and OFF, and thus it is possible to suppress distortion of the CSI-RS caused due to the change in the transmission power.

Figure 8:
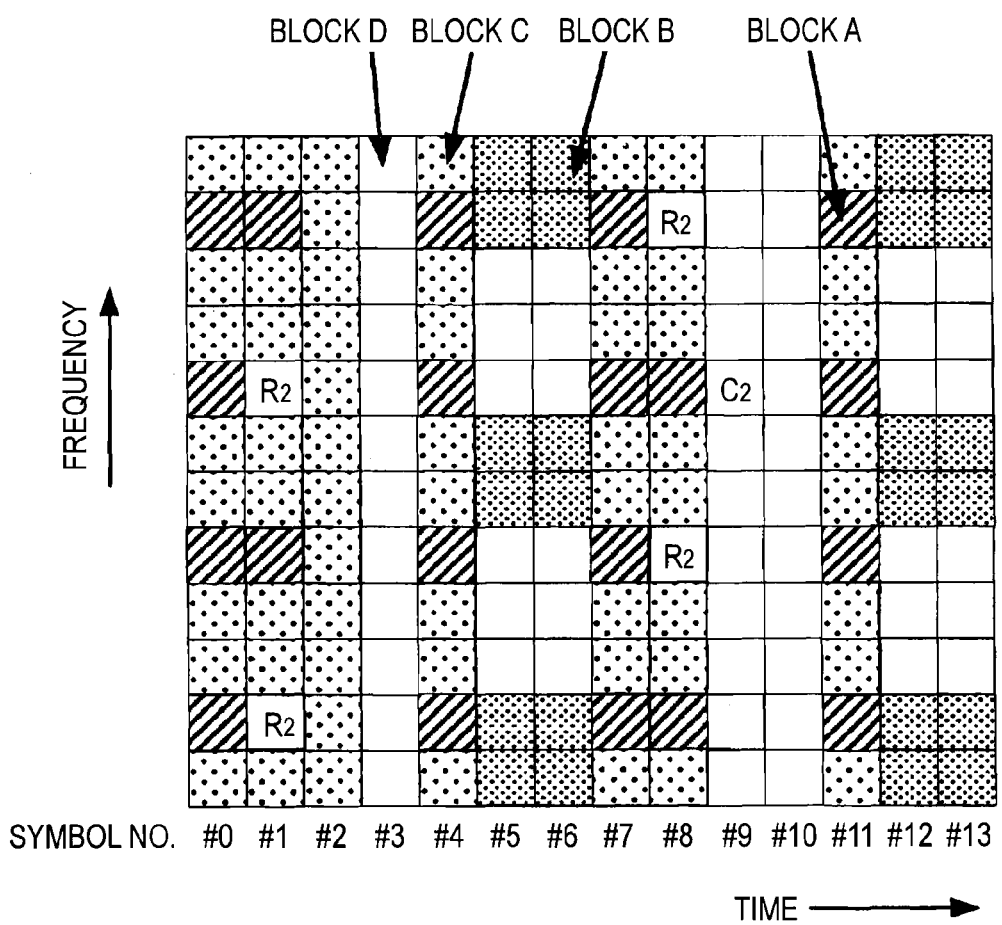
FIG. 8 is a schematic diagram (1) illustrating an exemplary arrangement of CSI-RSs corresponding to antenna port No. 2.

As shown in FIG. 8, blocks $R_2$ are arranged in OFDM symbols #1 and #8 and a block $C_2$ is arranged in OFDM symbol #9. Therefore, OFDM symbol #9 in which the CSI-RS corresponding to antenna port number 2 is arranged is adjacent to OFDM symbol #8 in which the CRS corresponding to antenna port number 2 is arranged. For example, compared to a case in which the block $C_2$ is arranged in OFDM symbol #10, in FIG. 8, it is possible to reduce the number of times the PA is switched between ON and OFF, and thus it is possible to suppress distortion of the CSI-RS caused due to the change in the transmission power.

Figure 9:
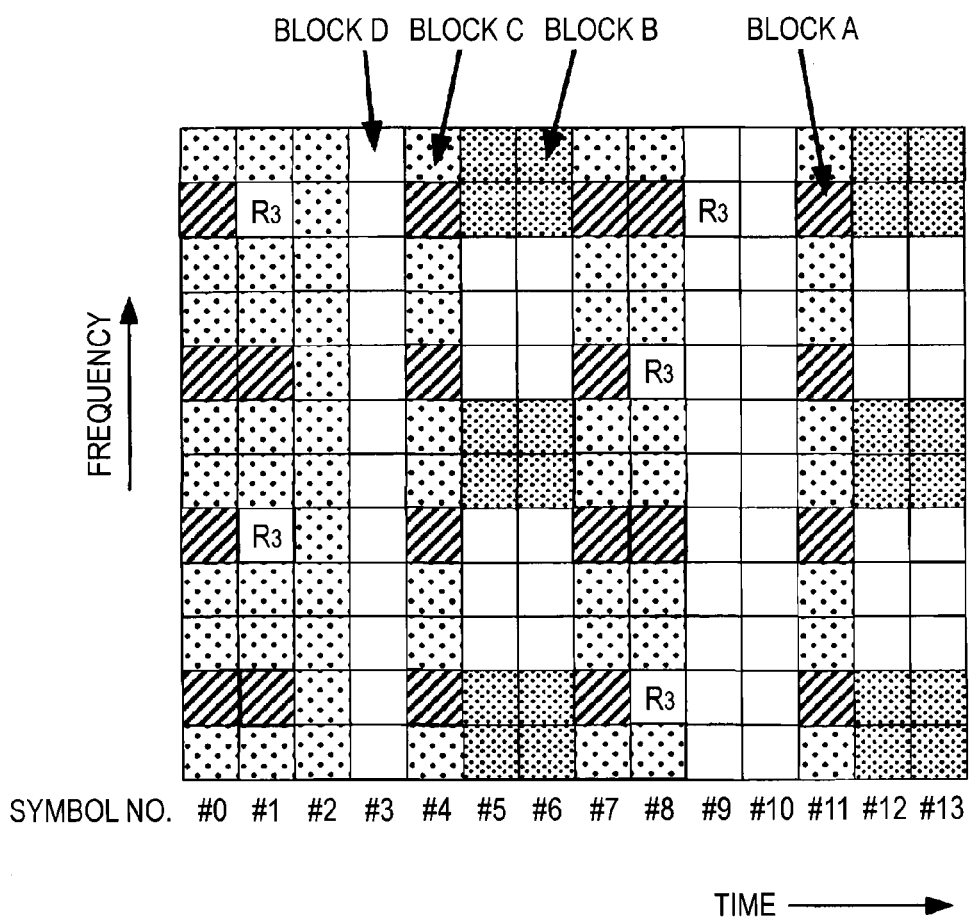
FIG. 9 is a schematic diagram (1) illustrating an exemplary arrangement of CSI-RSs corresponding to antenna port No. 3.

As shown in FIG. 9, blocks $R_3$ are arranged in OFDM symbols #1 and #8 and a block $C_3$ is arranged in OFDM symbol #9. Therefore, OFDM symbol #9 in which the CSI-RS corresponding to antenna port number 3 is arranged is adjacent to OFDM symbol #8 in which the CRS corresponding to antenna port number 3 is arranged. For example, compared to a case in which the block $C_3$ is arranged in OFDM symbol #10, in FIG. 9, it is possible to reduce the number of times the PA is switched between ON and OFF, and thus it is possible to suppress distortion of the CSI-RS caused due to the change in the transmission power.

Figure 10:
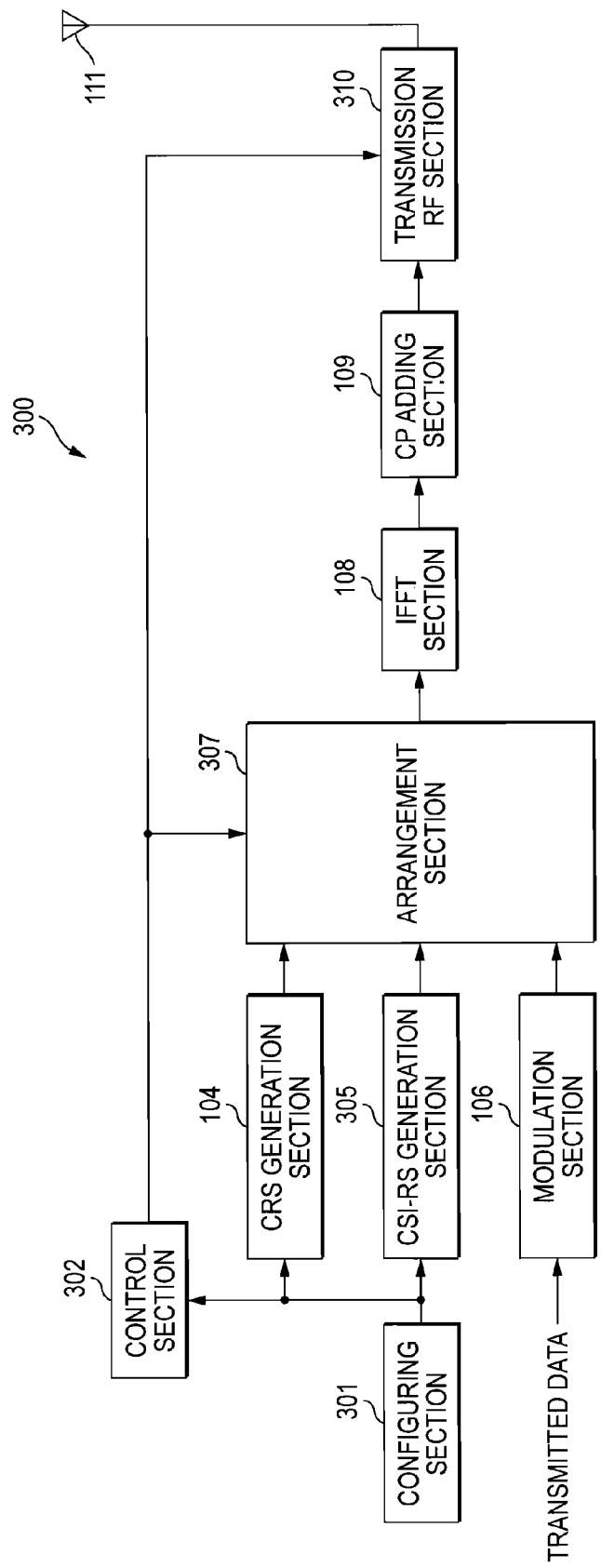
FIG. 10 is a block diagram illustrating the configuration of a base station 300.

Next, a base station 300 will be described as an example of a wireless communication apparatus according to the second embodiment with reference to FIG. 10. FIG. 10 is a block diagram illustrating the configuration of the base station 300.

The base station 300 shown in FIG. 10 includes a configuring section 301, a control section 302, a CRS generation section 104, a CSI-RS generation section 305, a modulation section 106, an arrangement section 307, an IFFT section 108, a CP adding section 109, a transmission RF section 310, and an antenna 111. The base station 300 according to the second embodiment is different from the base station 100 according to the first embodiment in that the base station 300 includes the configuring section 301, the control section 302, the CSI-RS generation section 305, the arrangement section 307, and the transmission RF section 310 instead of the configuring section 101, the control section 102, the CSI-RS generation section 105, the arrangement section 107, and the transmission RF section 110. The remaining configuration is the same as the configuration of the first embodiment. In FIG. 10, the same reference numerals are given to the constituent elements common to the constituent elements in FIG. 4.

For example, the configuring section 301 performs configuring so that the CRS corresponding to each antenna port is generated. When the CSI-RS is required to be transmitted to support the CoMP, the configuring section 301 configures "configuring information" that includes information indicating generation of the CSI-RS corresponding to each antenna port, information indicating the transmission power of the CSI-RS corresponding to each antenna port, and information indicating the arrangement of the CSI-RSs corresponding to each antenna port. Further, the configuring section 301 outputs the configuring information to the control section 102, the CRS generation section 104, and the CSI-RS generation section 105.

Based on the configuring information input from the configuring section 301, the control section 302 outputs the information indicating the arrangement of the CSI-RSs to the arrangement section 307 so that the information indicating the arrangement of the CSI-RSs corresponding to each antenna port is transmitted as a control signal of an upper layer to notify a mobile station 400 of the information indicating the arrangement of the CSI-RSs corresponding to each antenna port.

Here, the information indicating the arrangement of the CSI-RSs corresponding to each antenna port includes information indicating whether the CSI-RS corresponding to each antenna port is present, information indicating a RE in which the CSI-RS corresponding to each antenna port is arranged when the CSI-RS corresponding to each antenna port is present, information indicating a spreading code when a process such as a spreading process is performed on the CSI-RSs corresponding to each antenna port, and information indicating the transmission power of the CSI-RS corresponding to each antenna port. According to the information indicating the transmission power of the CSI-RS corresponding to each antenna port, the amplitude of the generated CSI-RS signal is adjusted to become a desired transmission power, for example, when power-boosting of increasing the transmission power of the CSI-RS than the signal of another RE is performed. Further, the information indicating the arrangement of the CSI-RS corresponding to each antenna port may not be transmitted with each sub-frame. Further, the information indicating the arrangement of the CSI-RSs may be transmitted as not the control signal of the upper layer but a control signal of a lower physical layer.

The transmission signal power of the CSI-RS corresponding to each antenna port is controlled when the CSI-RS generation section 305 generates the CSI-RS corresponding to each antenna port. However, when the power adjustment is possible for all of the OFDM symbols, for example, when only the CSI-RSs corresponding to each antenna port are transmitted with the OFDM symbol with which the CSI-RS signal corresponding to each antenna port is transmitted, the control section 302 may output a transmission power control signal to the transmission RF section 310 to adjust the transmission signal power of the OFDM symbol with which the CSI-RS corresponding to each antenna port is transmitted based on the configuring information input from the configuring section 301.

The CRS generation section 104 generates the CRSs corresponding to each antenna port based on the configuring information input from the configuring section 301. Then, the CRS generation section 104 outputs the generated CRSs corresponding to each antenna port to the arrangement section 307.

The CSI-RS generation section 305 generates the CSI-RSs corresponding to each antenna port based on the configuring information input from the configuring section 301. Then, the CSI-RS generation section 305 outputs the generated CSI-RSs corresponding to each antenna port to the arrangement section 307.

The modulation section 106 performs channel encoding and modulating on input transmitted data (downlink data) and outputs the modulated data signals to the arrangement section 307.

The arrangement section 307 multiplexes the CRSs, which correspond to each antenna port, input from the CRS generation section 104, the CSI-RSs, which correspond to each antenna port, input from the CSI-RS generation section 305, and the data signal (that is, PDSCH) input from the modulation section 106. Further, when the control information of the upper layer used for the control section 302 to notify the mobile station of the information indicating the arrangement of the CSI-RSs corresponding to each antenna port is present, the arrangement section 307 multiplexes this control information with the CRS, the CSI-RS, and the data signal (PDSCH).

Here, the arrangement section 307 arranges (multiplexes) the CRS corresponding to each antenna port, the CSI-RS corresponding to each antenna port, and the data signal (PDSCH) in each resource block. At this time, the arrangement section 307 arranges (multiplexes) the CRS corresponding to each antenna port, the CSI-RS corresponding to each antenna port, and the data signal (PDSCH) in each resource block so that the CSI-RS corresponding to each antenna port is arranged in the OFDM symbol adjacent before and after the OFDM symbol in which the CRS corresponding to each antenna port is arranged. For example, the exemplary arrangements shown in FIGS. 6 to 9 can be considered as the arrangement of the arrangement section 307.

Then, the arrangement section 307 outputs the multiplexed signal to the IFFT (Inverse Fast Fourier Transform) section 108.

The IFFT section 108 performs an IFFT process on the signal input from the arrangement section 307 to obtain a time region signal. Then, the IFFT section 108 outputs the time region signal to the CP (Cyclic Prefix) adding section 109.

The CP adding section 109 adds a CP to the time region signal input from the IFFT section 108 and outputs a signal obtained by adding the CP to the transmission RF (Radio Frequency) section 110.

The transmission RF section 310 performs transmission processes, such as D/A (Digital-to-Analog) conversion, up-conversion, and amplification, on the signal input from the CP adding section 109, and then wirelessly transmits the signal subjected to the transmission processes to the mobile station 400 via the antenna 111.

The base station 300 according to the second embodiment transmits the CSI-RSs corresponding to each antenna port with the OFDM symbol adjacent to the OFDM symbol with which the normally transmitted CRS corresponding to each antenna port is transmitted. Therefore, it is possible to reduce the number of times the ON/OFF of the OFDM symbol is performed. Further, it is possible to reduce the distortion of the CSI-RS corresponding to each antenna port and the interference to other CSI-RSs corresponding to each antenna port caused due to the occurrence of unnecessary radio waves.

Figure 11:
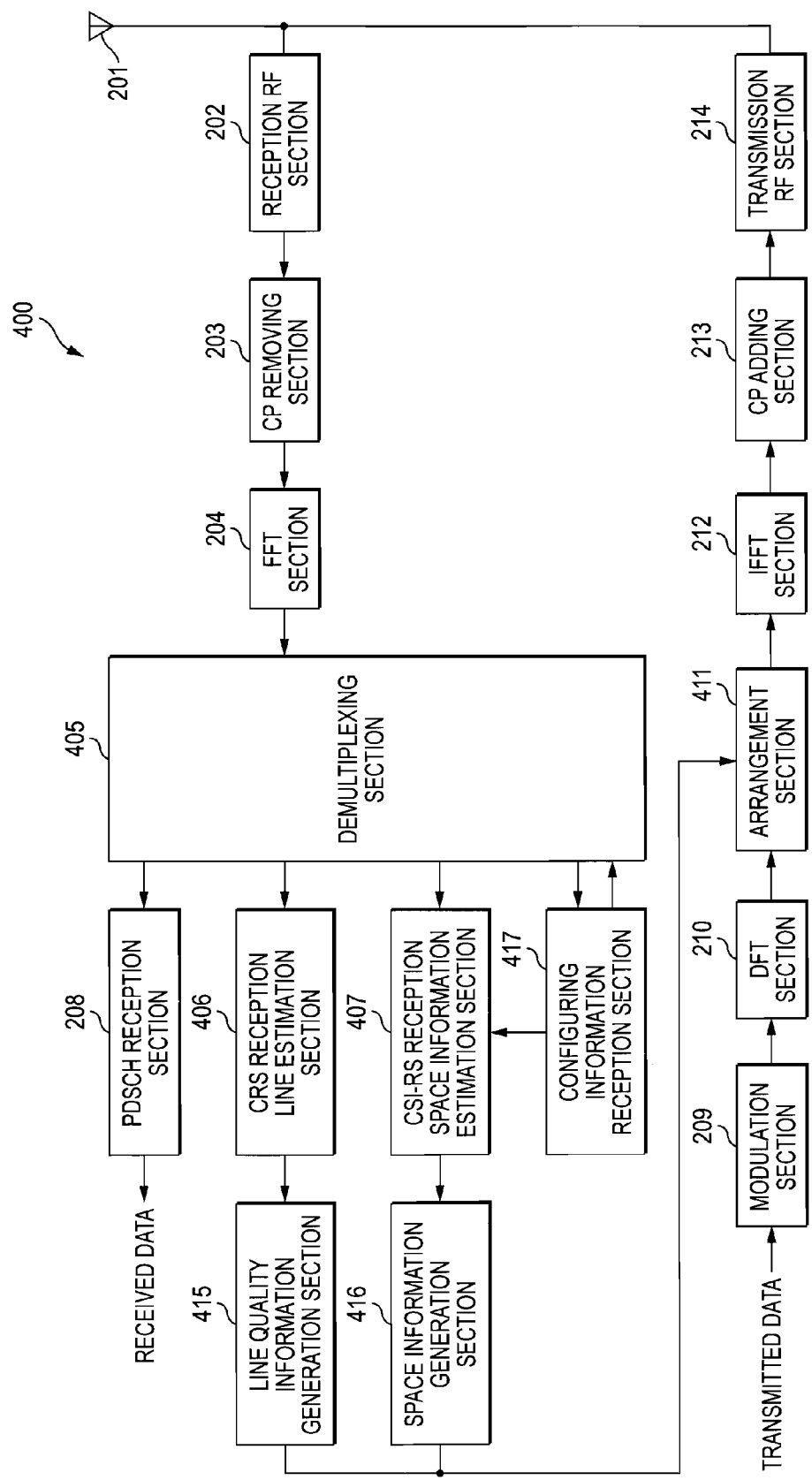
FIG. 11 is a block diagram illustrating the configuration of a mobile station 400.

Next, the configuration of the mobile station 400 communicating with the base station 300 will be described with reference to FIG. 11. FIG. 11 is a block diagram illustrating the configuration of the mobile station 400. The mobile station 400 shown in FIG. 11 includes an antenna 201, a reception RF section 202, a CP removing section 203, an FFT section 204, a demultiplexing section 405, a CRS reception line estimation section 406, a CSI-RS reception space information estimation section 407, a PDSCH reception section 208, a modulation section 209, a DFT section 210, an arrangement section 411, an IFFT section 212, a CP adding section 213, a transmission RF section 214, a line quality information generation section 415, a space information generation section 416, and a configuring information reception section 417. The mobile station 400 according to the second embodiment is different from the mobile station 200 according to the first embodiment in that the mobile station 400 includes the demultiplexing section 405, the CRS reception line estimation section 406, the CSI-RS reception space information estimation section 407, the arrangement section 411, the line quality information generation section 415, the space information generation section 416, and the configuring information reception section 417 instead of the demultiplexing section 205, the CRS reception line estimation section 206, the CSI-RS reception space information estimation section 207, the arrangement section 211, the line quality information generation section 215, the space information generation section 216, and the configuring information reception section 217. The remaining configuration is the same as the configuration of the first embodiment. In FIG. 11, the same reference numerals are given to the constituent elements common to the constituent elements in FIG. 5.

The reception RF section 202, which is configured to change a reception band, changes the reception band in accordance with a reception signal. The reception RF section 202 performs reception wireless processes (down-conversion, A/D (Analog-to-Digital) conversion, and the like) on a reception wireless signal (here, an OFDM (Orthogonal Frequency Division Multiplex) signal) received via the antenna 201, and then outputs the obtained reception signal to the CP removing section 203.

The CP removing section 203 removes the CP from the reception signal input from the reception RF section 202 and outputs the signal, from which the CP is removed, to the FFT (Fast Fourier Transform) section 204.

The FFT section 204 performs an FFT process on the signal input from the CP removing section 203 to acquire a frequency region signal. Then, the FFT section 204 outputs the frequency region signal to the demultiplexing section 405.

The demultiplexing section 405 demultiplexes the frequency region signal input from the FFT section 204 into the CRS corresponding to each antenna port, the CSI-RS corresponding to each antenna port, and the data signal (that is, the PDSCH). Based on the configuring information received with the immediately previous sub-frame or the more previous sub-frame, the demultiplexing section 405 outputs the CRS corresponding to each antenna port, the CSI-RS corresponding to each antenna port, and the PDSCH to the CRS reception section 406, the CSI-RS reception section 407, and the PDSCH reception section 208, respectively. Further, the demultiplexing section 405 outputs the control signal of the upper layer including the configuring information to the configuring information reception section 417.

Here, the "configuring information" refers to information that includes the information indicating the generation of the CSI-RS corresponding to each antenna port, information indicating the transmission power of the CSI-RS corresponding to each antenna port, and information indicating the arrangement of the CSI-RSs corresponding to each antenna port.

The configuring information reception section 417 reads the configuring information of the CSI-RS corresponding to each antenna port from the control signal input from the demultiplexing section 405, and then outputs the read configuration information to the demultiplexing section 405. Further, the configuring information reception section 417 outputs, to the CSI-RS reception space information estimation section 407, information on a reverse-spreading code or the like used to receive and demodulate the CSI-RS corresponding to each antenna port.

The CRS reception line estimation section 406 estimates a downlink, through which the signal is transmitted from the base station 300 to the own apparatus, based on the CRS, which corresponds to each antenna port, input from the demultiplexing section 405 and outputs a line estimation value of the downlink to the line quality information generation section 415.

The line quality information generation section 415 generates line quality information to be reported to the base station 300 based on the line estimation value input from the CRS reception line estimation section 406. The "line quality information" generated here refers to, for example, CQI (Channel Quality Indicator).

The CSI-RS reception space information estimation section 407 performs space information estimation of the downlink, through which the signal is transmitted from the base station 300 to the own apparatus, based on the CSI-RS, which corresponds to each antenna port, input from the demultiplexing section 405, referring to the configuring information of the CSI-RS, which corresponds to each antenna port, input from the configuring information reception section 417. Then, the CSI-RS reception space information estimation section 407 inputs the space estimation information to the space information generation section 416.

The space information generation section 416 generates space information to be reported to the base station 300 based on the input space estimation information input from CSI-RS reception space information estimation section 407. Further, the space information estimation is performed for not only the base station 300 communicating with the own apparatus but also another base station in the neighborhood of the own apparatus which is the target of the CoMP.

The PDSCH reception section 208 demodulates the PDSCH input from the demultiplexing section 405 to acquire the received data.

The modulation section 209 performs channel encoding and modulating on the input transmitted data (upstream data) and outputs the modulated data signal to the DFT (Discrete Fourier Transform) section 210.

The DFT section 210 performs the FFT process on the data signal input from the modulation section 209 to acquire a frequency region signal. The DFT section 210 outputs the frequency region signal to the arrangement section 411.

The arrangement section 411 arranges the line quality information input from the line quality information generation section 415, the space information input from the space information generation section 416, and the frequency region signal input from the DFT section 210 in upstream resource blocks.

The IFFT section 212 performs an IFFT process on the frequency region signal input from the arrangement section 411 to acquire a time region signal. Then, the IFFT section 212 outputs the time region signal to the CP adding section 213.

The CP adding section 213 adds a CP to the time region signal input from the IFFT section 212 and outputs the signal, to which the CP is added, to the transmission RF section 214.

The transmission RF section 214 performs transmission processes, such as D/A (Digital-to-Analog) conversion, up-conversion, and amplification, on the signal input from the CP adding section 213 and wirelessly transmits the signal subjected to the transmission processes to the base station 300 via the antenna 201.

The mobile station 400 according to the second embodiment demultiplexes the CSI-RSs corresponding to each antenna port from the signal which has been transmitted from the base station 300 and in which the CSI-RSs corresponding to each antenna port are arranged in the OFDM symbols continuous to the OFDM symbol with which the normally transmitted CRS corresponding to each antenna port is transmitted, and then performs the space information estimation of the downlink based on the CSI-RSs corresponding to each antenna port. Therefore, the space information to be reported to the base station 300 or a base station in the neighborhood of the target of the CoMP can be generated based on the CSI-RSs with no distortion corresponding to each antenna port.

(Third Embodiment)

A base station 500 according to a third embodiment spreads a CSI-RS corresponding to an antenna port in the time direction and transmits the CSI-RS with a symbol inserted between a plurality of OFDM symbols with which the CRS of this antenna is transmitted.

FIGS. 12 to 15 are diagrams schematically illustrating exemplary arrangements of the CSI-RSs corresponding to each antenna port according to the third embodiment. In FIGS. 12 to 15, each vertical axis represents a frequency and each horizontal axis represents a time. One sub-frame is formed by fourteen OFDM symbols of OFDM symbol #0 to OFDM symbol #13 shown along the horizontal axis. In regard to regions partitioning the OFDM symbols, as shown in FIGS. 12 to 15, a block A (indicated by diagonal lines) refers to a resource region with which a CRS is likely to be transmitted, a block B (indicated by dense dots) refers to a DMRS region, a block C (indicated by sparse dots) refers to a region with which a PDCCH is likely to be transmitted, and a block D (indicated by a blank) refers to a region with which the CSI-RS is likely to be arranged. In the exemplary arrangements shown in FIGS. 12 to 15, up to three cells can be multiplexed by eight antenna ports, as in FIG. 1. In the exemplary arrangements shown in FIGS. 12 to 15, up to three cells can be multiplexed with four antenna ports, as in FIG. 1. In the exemplary arrangements shown in FIGS. 12 to 15, a region of an OFDM symbol in which the CRS of antenna port number m (where m is a natural number of 0 to 4) is arranged is referred to as a block Rm. Further, a region of an OFDM symbol in which the CSI-RS corresponding to antenna port number m is arranged is referred to as a block Cm.

Figure 12:
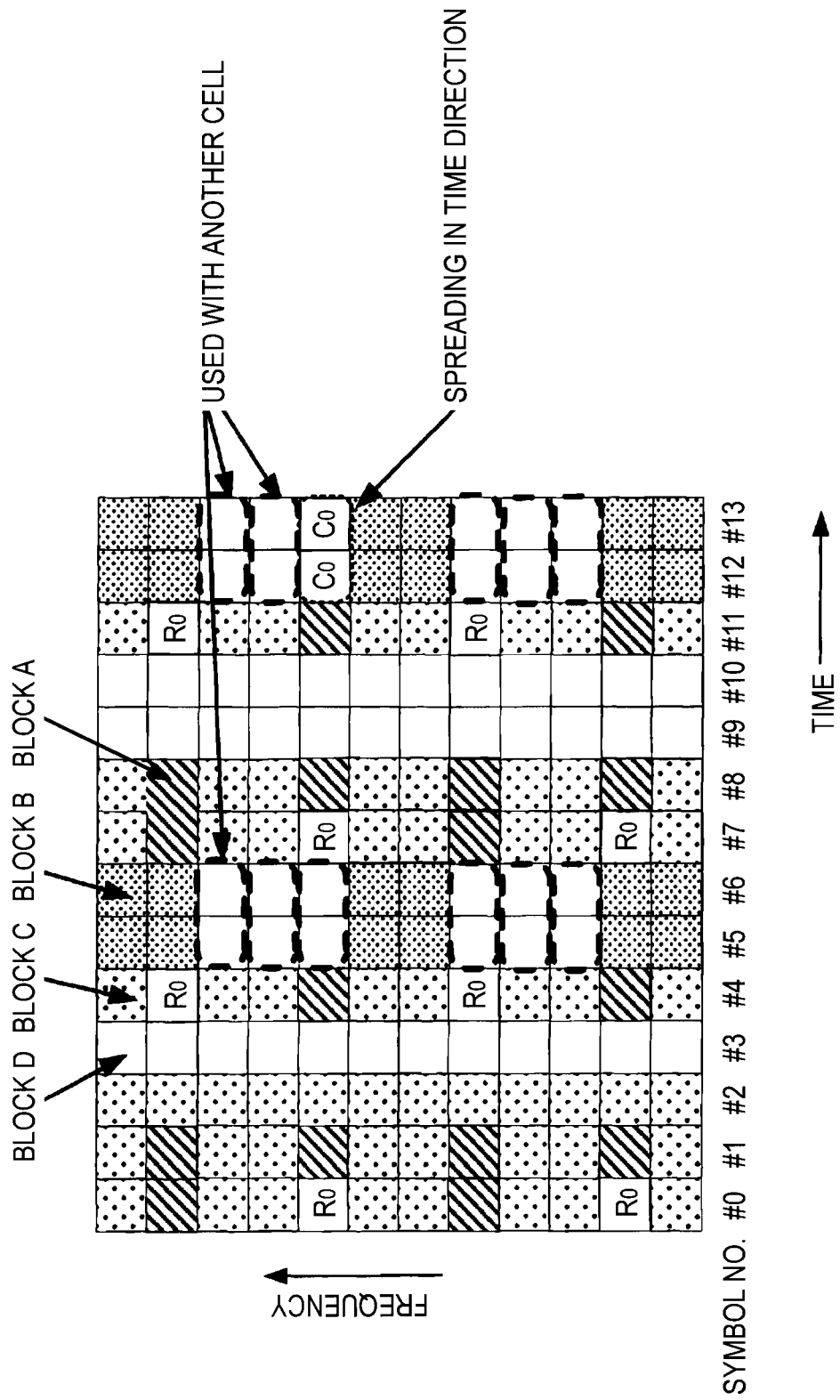
FIG. 12 is a schematic diagram (2) illustrating an exemplary arrangement of CSI-RSs corresponding to antenna port No. 0.

As shown in FIG. 12, blocks $R_0$ are arranged in OFDM symbols #0, #4, #7, and #11 and a block $C_o$ is arranged in a region other than the DMRS region between OFDM symbols

12 and #13 temporally continuous to each other. In this embodiment, the CSI-RSs spreading twice in the time direction are arranged in OFDM symbols #12 and #13 inserted between OFDM symbol #11, in which the CRS is arranged, and OFDM symbol #0 of the subsequent sub-frame. Therefore, when viewed from OFDM symbol #11 in the time direction (the horizontal axis of FIG. 12), the CRS, the CSI-RS, and the CRS are continuously transmitted. That is, the PA is not switched between ON and OFF before and after the transmission of the CSI-RS. Therefore, in the base station 500, it is possible to reduce the number of times the PA is switched between ON and OFF, and thus it is possible to suppress distortion of the CSI-RS caused due to the change in the transmission power. In the exemplary arrangement shown in FIG. 12, the CSI-RS to be transmitted to another base station in the neighborhood of the own apparatus which is the target of the CoMP can be arranged in the region of the block D among the regions surrounded by the dashed lines.

Figure 13:
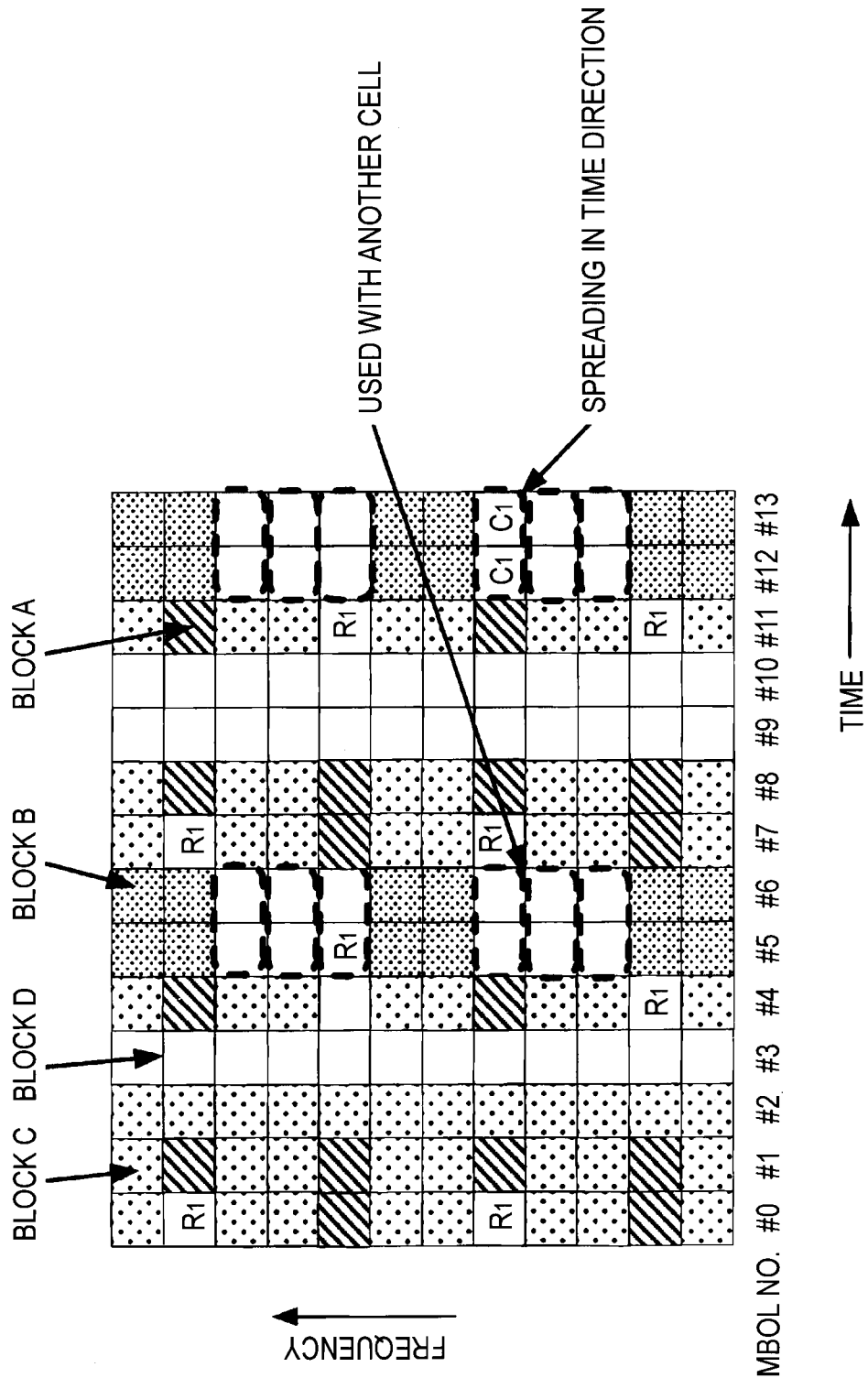
FIG. 13 is a schematic diagram (2) illustrating an exemplary arrangement of CSI-RSs corresponding to antenna port No. 1.

As shown in FIG. 13, blocks $R_1$ are arranged in OFDM symbols #0, #4, #7, and #11 and a block $C_1$ is arranged in a region other than the DMRS region between OFDM symbols #12 and #13 temporally continuous to each other. In this embodiment, the CSI-RSs spreading twice in the time direction are arranged in OFDM symbols #12 and #13 inserted between OFDM symbol #11, in which the CRS is arranged, and OFDM symbol #0 of the subsequent sub-frame. Therefore, when viewed from OFDM symbol #11 in the time direction (the horizontal axis of FIG. 13), the CRS, the CSI-RS, and the CRS are continuously transmitted. That is, the PA is not switched between ON and OFF before and after the transmission of the CSI-RS. Therefore, in the base station 500, it is possible to reduce the number of times the PA is switched between ON and OFF, and thus it is possible to suppress distortion of the CSI-RS caused due to the change in the transmission power. In the exemplary arrangement shown in FIG. 13, the CSI-RS to be transmitted to another base station in the neighborhood of the own apparatus which is the target of the CoMP can be arranged in the region of the block D among the regions surrounded by the dashed lines.

Figure 14:
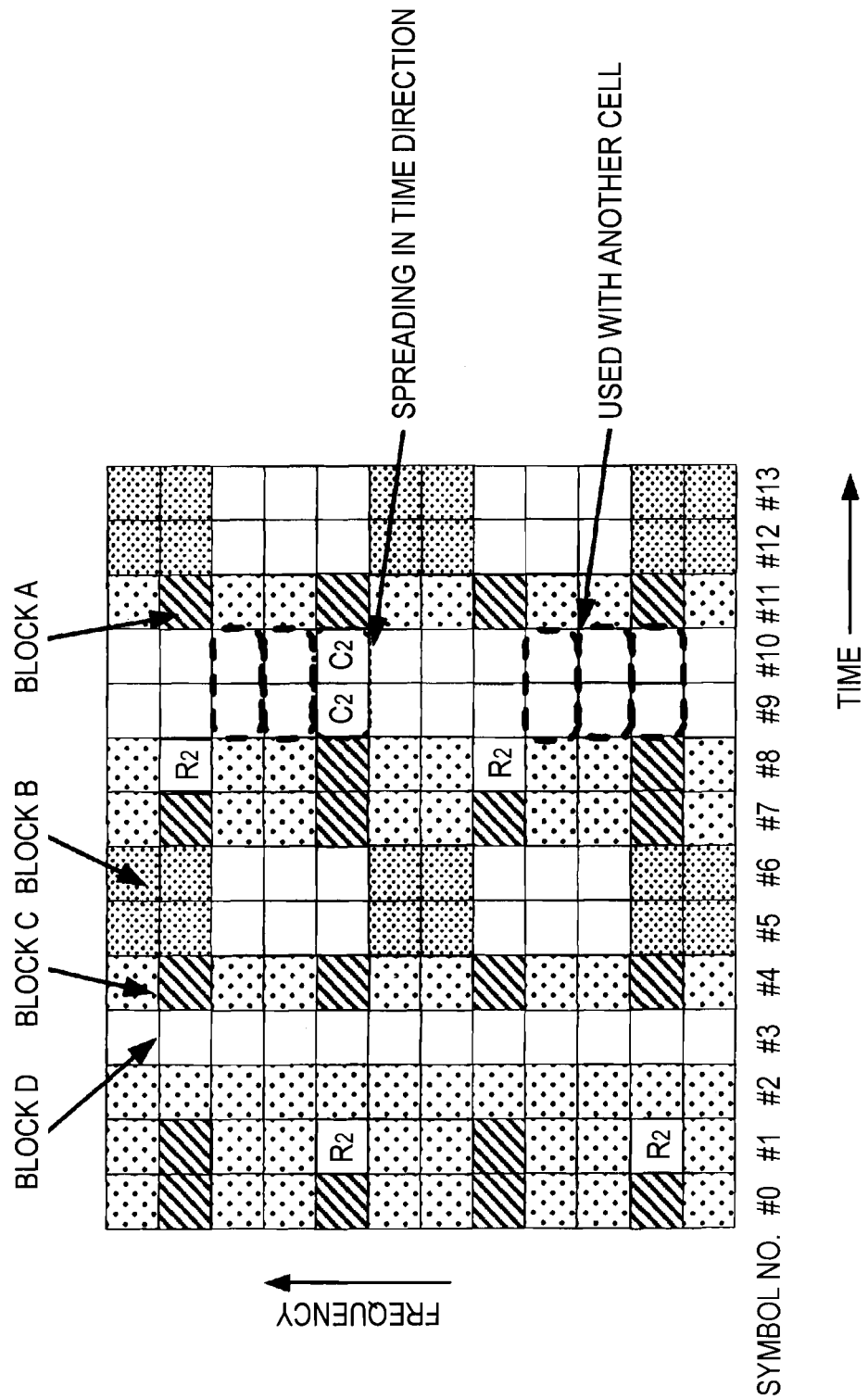
FIG. 14 is a schematic diagram (2) illustrating an exemplary arrangement of CSI-RSs corresponding to antenna port No. 2.

As shown in FIG. 14, blocks $R_2$ are arranged in OFDM symbols #1 and #8 and a block $C_2$ is arranged in OFDM symbols #9 and #10 temporally continuous to each other. In this embodiment, the CSI-RSs spreading twice in the time direction are arranged in OFDM symbols #12 and #13 continuous to OFDM symbol #8 in which the CRS is arranged. Therefore, when viewed from OFDM symbol #8 in the time direction (the horizontal axis of FIG. 14), the CRS and the CSI-RS are continuously transmitted. That is, the PA is not switched between ON and OFF before and after the transmission of the CSI-RS. Therefore, in the base station 500, it is possible to reduce the number of times the PA is switched between ON and OFF, and thus it is possible to suppress distortion of the CSI-RS caused due to the change in the transmission power.

In regard to the CSI-RS corresponding to antenna port number 2, as shown in FIG. 14, it is difficult to transmit the CSI-RS temporally continuously with the CRS with the OFDM symbol between the OFDM symbols in which the CRS is arranged. However, by spreading the CSI-RS in the time direction and transmitting the CSI-RS with OFDM symbols #9 and #10 adjacent to OFDM symbol #8 in which the CRS is transmitted, it is possible to exclude the influence of the rise of a signal. Moreover, by reversely spreading the CSI-RS not receiving the influence of the change in the signal power at the reception time and the CSI-RS receiving the influence of the fall of the signal, it is possible to reduce the influence of the fall of the signal. In the exemplary arrangement shown in FIG. 14, the CSI-RS to be transmitted to another base station in the neighborhood of the own apparatus which is the target of the CoMP can be arranged in the region of the block D among the regions surrounded by the dashed lines.

Figure 15:
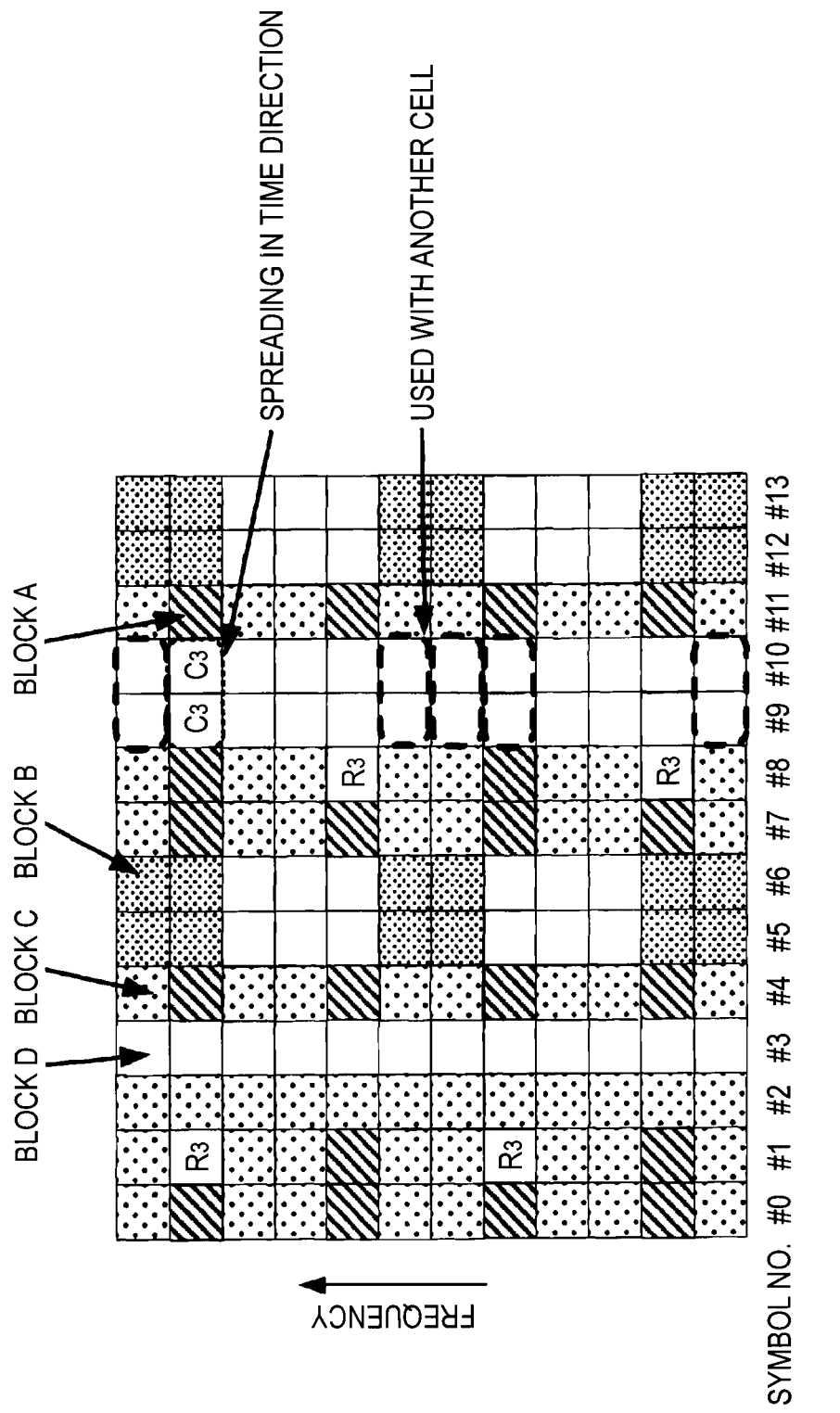
FIG. 15 is a schematic diagram (2) illustrating an exemplary arrangement of CSI-RSs corresponding to antenna port No. 3.

As shown in FIG. 15, blocks $R_3$ are arranged in OFDM symbols #1 and #8 and a block $C_3$ is arranged in OFDM symbols #9 and #10 temporally continuous to each other. In this embodiment, the CSI-RSs spreading twice in the time direction are arranged in OFDM symbols #12 and #13 continuous to OFDM symbol #8 in which the CRS is arranged. Therefore, when viewed from OFDM symbol #8 in the time direction (the horizontal axis of FIG. 15), the CRS and the CSI-RS are continuously transmitted. That is, the PA is not switched between ON and OFF before and after the transmission of the CSI-RS. Therefore, in the base station 500, it is possible to reduce the number of times the PA is switched between ON and OFF, and thus it is possible to suppress distortion of the CSI-RS caused due to the change in the transmission power.

In regard to the CSI-RS corresponding to antenna port number 3, as shown in FIG. 15, it is difficult to transmit the CSI-RS temporally continuously with the CRS with the OFDM symbol between the OFDM symbols in which the CRS is arranged. However, by spreading the CSI-RS in the time direction and transmitting the CSI-RS with OFDM symbols #9 and #10 adjacent to OFDM symbol #8 in which the CRS is transmitted, it is possible to exclude the influence of the rise of a signal. Moreover, by reversely spreading the CSI-RS not receiving the influence of the change in the signal power at the reception time and the CSI-RS receiving the influence of the fall of the signal, it is possible to reduce the influence of the fall of the signal. In the exemplary arrangement shown in FIG. 15, the CSI-RS to be transmitted to another base station in the neighborhood of the own apparatus which is the target of the CoMP can be arranged in the region of the block D among the regions surrounded by the dashed lines.

The methods of arranging the CSI-RSs corresponding to each antenna port shown in FIGS. 13 to 15, the CSI-RS is spread twice in the time direction and an orthogonal code is multiplied. Therefore, up to two CSI-RSs can be multiplexed in the same RE. Accordingly, the CSI-RS of another antenna port of the same cell may be multiplied. Further, the CSI-RS of another cell may be multiplexed. By performing coding and multiplexing, the resources with which the CSI-RSs are transmitted can be maintained to be the same as the resources before the spreading.

Figure 16:
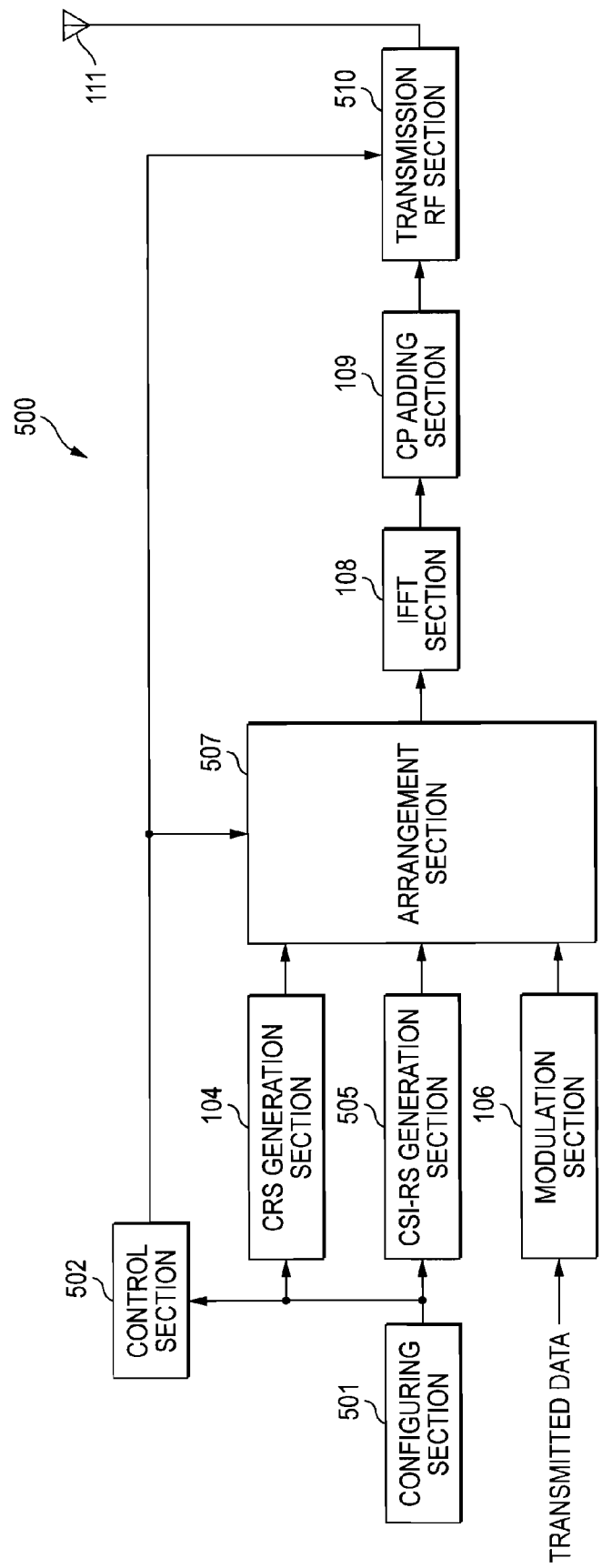
FIG. 16 is a block diagram illustrating the configuration of a base station 500.

Next, a base station 500 will be described as an example of a wireless communication apparatus according to the third embodiment with reference to FIG. 16. FIG. 16 is a block diagram illustrating the configuration of the base station 500. The base station 500 shown in FIG. 16 includes a configuring section 501, a control section 502, a CRS generation section 104, a CSI-RS generation section 505, a modulation section 106, an arrangement section 507, an IFFT section 108, a CP adding section 109, a transmission RF section 510, and an antenna 111. The base station 500 according to the third embodiment is different from the base station 100 according to the first embodiment in that the base station 500 includes the configuring section 501, the control section 502, the CSI-RS generation section 505, the arrangement section 507, and the transmission RF section 510 instead of the configuring section 101, the CSI-RS generation section 105, the arrangement section 107, and the transmission RF section 110. The remaining configuration is the same as the configuration of the first embodiment. In FIG. 16, the same reference numerals are given to the constituent elements common to the constituent elements in FIG. 4.

The configuring section 501 performs configuring so that the CRS spreading in the time direction so as to correspond to each antenna port is generated. When the CSI-RS spreading in the time direction is required to be transmitted to support the CoMP, the configuring section 501 configures "configuring information" that includes information indicating generation of the CSI-RS spreading in the time direction so as to correspond to each antenna port, information indicating the transmission power of the CSI-RS spreading in the time direction so as to correspond to each antenna port, and information indicating the arrangement of the CSI-RSs spreading in the time direction so as to correspond to each antenna port. Further, the configuring section 501 outputs the configuring information to the control section 502, the CRS generation section 104, and the CSI-RS generation section 505.

In this embodiment, spreading the CSI-RSs in the time direction includes simply copying the CSI-RSs in the time direction.

Based on the configuring information input from the configuring section 501, the control section 502 outputs the information indicating the arrangement of the CSI-RSs to the arrangement section 507 so that the information indicating the arrangement of the CSI-RSs is transmitted as a control signal of an upper layer to notify a mobile station 600 of the information indicating the arrangement of the CSI-RSs corresponding to each antenna port.

Here, the information indicating the arrangement of the CSI-RSs spreading in the time direction so as to correspond to each antenna port includes information indicating whether the CSI-RS spreading in the time direction so as to correspond to each antenna port is present, information indicating a RE in which the CSI-RS spreading in the time direction so as to correspond to each antenna port is arranged when the CSI-RS is present, information indicating a spreading code used for the CSI-RS spreading in the time direction so as to correspond to each antenna port, and information indicating the transmission power of the CSI-RS spreading in the time direction so as to correspond to each antenna port. Further, the information indicating the arrangement of the CSI-RS corresponding to each antenna port may not be transmitted with each subframe. Further, the information indicating the arrangement of the CSI-RSs may be transmitted as not the control signal of the upper layer but a control signal of a lower physical layer.

The transmission signal power of the CSI-RS is controlled when the CSI-RS generation section 505 generates the CSI-RS spreading in the time direction so as to correspond to each antenna port. However, when the power adjustment is possible for all of the OFDM symbols, for example, when only the CSI-RSs spreading in the time direction so as to correspond to each antenna port are transmitted with the OFDM symbol with which the CSI-RS signal corresponding to each antenna port is transmitted, the control section 502 may output a transmission power control signal to the transmission RF section 510 to adjust the transmission signal power of the OFDM symbol with which the CSI-RS spreading in the time direction so as to correspond to each antenna port is transmitted based on the configuring information input from the configuring section 501.

The CRS generation section 104 generates the CRSs corresponding to each antenna port based on the configuring information input from the configuring section 501. Then, the CRS generation section 104 outputs, to the arrangement section 507, the generated CRSs corresponding to each antenna port.

The CSI-RS generation section 505 generates the CSI-RSs spreading in the time direction so as to correspond to each antenna port based on the configuring information input from the configuring section 501. Then, the CSI-RS generation section 505 outputs, to the arrangement section 507, the generated CSI-RSs spreading in the time direction so as to correspond to each antenna port.

The modulation section 106 performs channel encoding and modulating on input transmitted data (downlink data) and outputs the modulated data signals to the arrangement section 507.

The arrangement section 507 multiplexes the CRSs, which correspond to each antenna port, input from the CRS generation section 104, the CSI-RSs, which spread in the time direction so as to correspond to each antenna port, input from the CSI-RS generation section 505, and the data signal (that is, PDSCH) input from the modulation section 106. Further, when the control information of the upper layer used for the control section 502 to notify the mobile station of the information indicating the arrangement of the CSI-RSs corresponding to each antenna port is present, the arrangement section 507 multiplexes this control information with the CRS, the CSI-RS, and the data signal (PDSCH).

Here, the arrangement section 507 arranges (multiplexes) the CRS corresponding to each antenna port, the CSI-RS corresponding to each antenna port, and the data signal (PDSCH) in each resource block. At this time, the arrangement section 507 arranges (multiplexes) the CRS corresponding to each antenna port, the CSI-RS corresponding to each antenna port, and the data signal (PDSCH) in each resource block so that the CSI-RS corresponding to each antenna port is arranged in the OFDM symbol adjacent before and after the OFDM symbol in which the CRS corresponding to each antenna port is arranged. For example, the exemplary arrangements shown in FIGS. 12 to 15 can be considered as the arrangement of the arrangement section 507.

Then, the arrangement section 507 outputs the multiplexed signal to the IFFT (Inverse Fast Fourier Transform) section 108.

The IFFT section 108 performs an IFFT process on the signal input from the arrangement section 507 to obtain a time region signal. Then, the IFFT section 108 outputs the time region signal to the CP (Cyclic Prefix) adding section 109.

The CP adding section 109 adds a CP to the time region signal input from the IFFT section 108 and outputs a signal obtained by adding the CP to the transmission RF (Radio Frequency) section 510.

The transmission RF section 510 performs transmission processes, such as D/A (Digital-to-Analog) conversion, up-conversion, and amplification, on the signal input from the CP adding section 109, and then wirelessly transmits the signal subjected to the transmission processes to the mobile station 600 via the antenna 111.

The base station 500 according to the third embodiment transmits the CSI-RSs spreading in the time direction so as to correspond to each antenna port with the OFDM symbol adjacent to the OFDM symbol with which the normally transmitted CRS spreading in the time direction so as to correspond to each antenna port is transmitted. Therefore, it is possible to reduce the number of times the ON/OFF of the OFDM symbol is performed. Further, it is possible to reduce the distortion of the CSI-RS spreading in the time direction so as to correspond to each antenna port and the interference to other CSI-RSs spreading in the time direction so as to correspond to each antenna port caused due to the occurrence of unnecessary radio waves.

Figure 17:
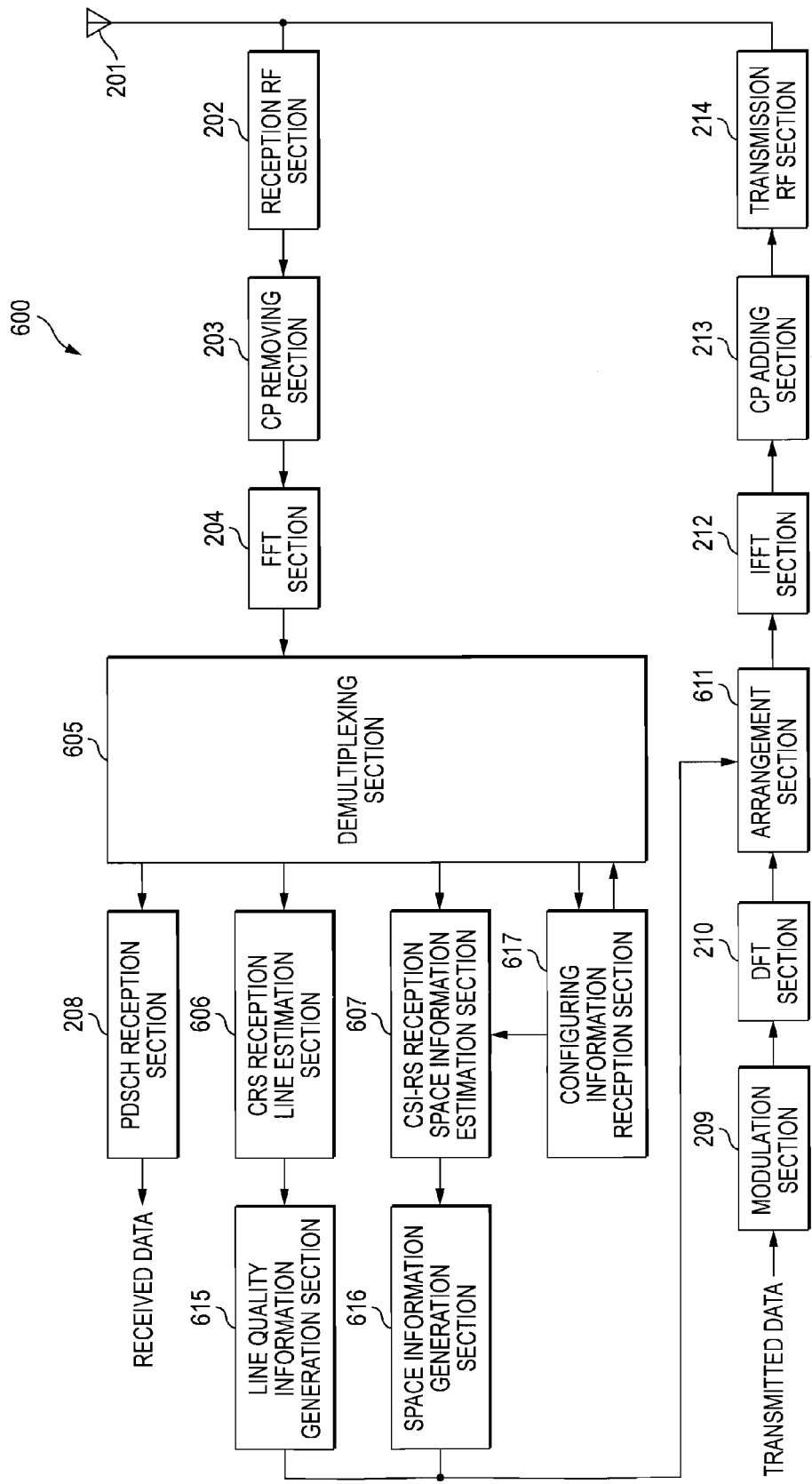
FIG. 17 is a block diagram illustrating the configuration of a mobile station 600.

Next, the configuration of the mobile station 600 communicating with the base station 500 will be described with reference to FIG. 17. FIG. 17 is a block diagram illustrating the configuration of the mobile station 600. The mobile station 600 shown in FIG. 17 includes an antenna 201, a reception RF section 202, a CP removing section 203, an FFT section 204, a demultiplexing section 605, a CRS reception line estimation section 606, a CSI-RS reception space information estimation section 607, a PDSCH reception section 208, a modulation section 209, a DFT section 210, an arrangement section 611, an IFFT section 212, a CP adding section 213, a transmission RF section 214, a line quality information generation section 615, a space information generation section 616, and a configuring information reception section 617.

The reception RF section 202, which is configured to change a reception band, changes the reception band in accordance with a reception signal. The reception RF section 202 performs reception wireless processes (down-conversion, A/D (Analog-to-Digital) conversion, and the like) on a reception wireless signal (here, an OFDM (Orthogonal Frequency Division Multiplex) signal) received via the antenna 201, and then outputs the obtained reception signal to the CP removing section 203.

The CP removing section 203 removes the CP from the reception signal input from the reception RF section 202 and outputs the signal, from which the CP is removed, to the FFT (Fast Fourier Transform) section 204.

The FFT section 204 performs an FFT process on the signal input from the CP removing section 203 to acquire a frequency region signal. Then, the FFT section 204 outputs the frequency region signal to the demultiplexing section 605.

The demultiplexing section 605 demultiplexes the frequency region signal input from the FFT section 204 into the CRS corresponding to each antenna port, the CSI-RS spreading in the time direction so as to correspond to each antenna port, and the data signal (that is, the PDSCH). Based on the configuring information received with the immediately previous sub-frame or the more previous sub-frame, the demultiplexing section 605 outputs the CRS corresponding to each antenna port, the CSI-RS spreading in the time direction so as to correspond to each antenna port, and the PDSCH to the CRS reception section 606, the CSI-RS reception section 607, and the PDSCH reception section 208, respectively. Further, the demultiplexing section 605 outputs the control signal of the upper layer including the configuring information to the configuring information reception section 617.

Here, the "configuring information" refers to information that includes the information indicating the generation of the CSI-RS spreading in the time direction so as to correspond to each antenna port, information indicating the transmission power of the CSI-RS spreading in the time direction so as to correspond to each antenna port, and information indicating the arrangement of the CSI-RSs spreading in the time direction so as to correspond to each antenna port.

The configuring information reception section 617 reads the configuring information of the CSI-RS g spreading in the time direction so as to correspond to each antenna port from the control signal input from the demultiplexing section 605, and then outputs the read configuration information to the demultiplexing section 605. Further, the configuring information reception section 617 outputs, to the CSI-RS reception space information estimation section 607, information on a reverse-spreading code or the like used to receive and demodulate the CSI-RS spreading in the time direction so as to correspond to each antenna port.

The CRS reception line estimation section 606 estimates a downlink, through which the signal is transmitted from the base station 500 to the own apparatus, based on the CRS, which corresponds to each antenna port, input from the demultiplexing section 605 and outputs a line estimation value of the downlink to the line quality information generation section 615.

The line quality information generation section 615 generates line quality information to be reported to the base station 500 based on the line estimation value input from the CRS reception line estimation section 606. The "line quality information" generated here refers to, for example, CQI (Channel Quality Indicator).

The CSI-RS reception space information estimation section 607 performs space information estimation of the downlink, through which the signal is transmitted from the base station 500 to the own apparatus, based on the CSI-RS, which spreads in the time direction so as to correspond to each antenna port, input from the demultiplexing section 605, referring to the configuring information of the CSI-RS, which spreads in the time direction so as to correspond to each antenna port, input from the configuring information reception section 617. Then, the CSI-RS reception space information estimation section 607 inputs the space estimation information to the space information generation section 616.

The space information generation section 616 generates space information to be reported to the base station 500 based on the input space estimation information input from CSI-RS reception space information estimation section 607. Further, the space information estimation is performed for not only the base station 500 communicating with the own apparatus but also another base station in the neighborhood of the own apparatus which is the target of the CoMP.

The PDSCH reception section 208 demodulates the PDSCH input from the demultiplexing section 605 to acquire the received data.

The modulation section 209 performs channel encoding and modulating on the input transmitted data (upstream data) and outputs the modulated data signal to the DFT (Discrete Fourier Transform) section 210.

The DFT section 210 performs the FFT process on the data signal input from the modulation section 209 to acquire a frequency region signal. The DFT section 210 outputs the frequency region signal to the arrangement section 611.

The arrangement section 611 arranges the line quality information input from the line quality information generation section 615, the space information input from the space information generation section 616, and the frequency region signal input from the DFT section 210 in upstream resource blocks.

The IFFT section 212 performs an IFFT process on the frequency region signal input from the arrangement section 611 to acquire a time region signal. Then, the IFFT section 212 outputs the time region signal to the CP adding section 213.

The CP adding section 213 adds a CP to the time region signal input from the IFFT section 212 and outputs the signal, to which the CP is added, to the transmission RF section 214.

The transmission RF section 214 performs transmission processes, such as D/A (Digital-to-Analog) conversion, up-conversion, and amplification, on the signal input from the CP adding section 213 and wirelessly transmits the signal subjected to the transmission processes to the base station 500 via the antenna 201.

The mobile station 600 according to the third embodiment demultiplexes the CSI-RSs spreading in the time direction so as to correspond to each antenna port from the signal which has been transmitted from the base station 500 and in which the CSI-RSs spreading in the time direction so as to correspond to each antenna port are arranged in the OFDM symbols continuous to the OFDM symbol with which the normally transmitted CRS corresponding to each antenna port is transmitted, and then performs the space information estimation of the downlink based on the CSI-RSs spreading in the time direction so as to correspond to each antenna port. Therefore, the space information to be reported to the base station 500 or a base station in the neighborhood of the target of the CoMP can be generated based on the CSI-RSs with no distortion spreading in the time direction so as to correspond to each antenna port. Further, it is possible to reduce the influence of the change in the signal power caused due to the reverse-spreading.

In this embodiment, when the reference signal of each antenna port is transmitted by another antenna and another amplifier, the number of times each amplifier is switched between ON and OFF can be reduced by copying the CSI-RSs corresponding to each antenna port in the time direction and arranging the CSI-RSs between the OFDM symbols in which the CRS of each antenna port is arranged or in the OFDM symbol continuous to the OFDM symbol in which the CRS of each antenna port is arranged.

In this embodiment, the plurality of CSI-RSs can be encoded and multiplexed by spreading the CSI-RSs and multiplying an orthogonal code. Accordingly, the resources necessary for the CSI-RSs can be maintained to be the same as the resources before the spreading. Further, even when all of the spread CSI-RSs may not be arranged in the OFDM symbols adjacent to the CRS, it is possible to reduce the influence of the change in the signal power caused due to the reverse spreading.

(Fourth Embodiment)

A base station 700 according to a fourth embodiment spreads and multiplexes the CSI-RSs of each antenna port in the time direction, when the OFDM symbols of the PDCCH (Physical Downlink Control CHannel) are arranged up to two symbols from the beginning of a sub-frame. Further, the base station 700 multiplexes the CSI-RSs of each antenna port without spreading the CSI-RSs in the time direction, when the OFDM symbols of the PDCCH are arranged up to three symbols from the beginning of a sub-frame. A mobile station 800 is not explicitly notified of whether to spread the CSI-RSs in the time direction. However, the mobile station 800 is implicitly notified of whether to spread the CSI-RSs in the time direction using the PCFICH.

FIGS. 18(a) and 18(b) are diagrams schematically illustrating exemplary arrangements 1 and 2 in the wireless transmission apparatus (base station) 700 according to the fourth embodiment. In FIGS. 18(a) and 18(b), each vertical axis represents a frequency and each horizontal axis represents a time. One sub-frame is formed by fourteen OFDM symbols of OFDM symbol #0 to OFDM symbol #13 shown along the horizontal axis. In regard to regions partitioning the OFDM symbols, as shown in FIGS. 18(a) and 18(b), a block A (indicated by diagonal lines) refers to a resource region with which a CRS is likely to be transmitted, a block B (indicated by dense dots) refers to a DMRS region, a block C (indicated by sparse dots) refers to a region with which a PDCCH is likely to be transmitted, and a block D (indicated by a blank) refers to a region with which the CSI-RS is likely to be arranged. In the exemplary arrangements shown in FIGS. 18(a) and 18(b), up to three cells can be multiplexed by eight antenna ports, as in FIG. 1. In the exemplary arrangements shown in FIGS. 18(a) and 18(b), a region of an OFDM symbol in which the CSI-RS corresponding to antenna port number m (where m is a natural number of 0 to 4) is arranged is referred to as a block Cm.

In FIGS. 18(a) and 18(b), the CSI-RSs corresponding to each antenna port are copied in the time direction so as to match the number of symbols of the PDCCH. When the PDCCHs are arranged in one symbol or two symbols from the beginning of the sub-frame, as in FIG. 18(a), the CSI-RSs of each antenna port are spread twice in the time direction and are arranged in OFDM symbols #2 and #3. When the PDCCHs are arranged up to three symbols from the beginning of the sub-frame, as in FIG. 18(b), the CSI-RSs are arranged only in OFDM symbols #3 without spreading the CSI-RSs in the time direction. Whether to spread the CSI-RSs in the time direction corresponds to the number of OFDM symbols of the PDCCHs to be used. Therefore, the mobile station 800 is not explicitly notified only for the CSI-RSs. The mobile station 800 is implicitly notified by using a PCFICH (Physical Control Format Indicator Channel) used to notify the mobile station 800 of the number of OFDM symbols of the PDCCHs to be used instead. Further, the CSI-RSs copied in the time direction may be multiplied by an orthogonal code and may be encoded and multiplexed. In the exemplary arrangements shown in FIGS. 18(a) and 18(b), the CSI-RS to be transmitted to another base station in the neighborhood of the own apparatus which is the target of the CoMP can be arranged in the region of the block D among the regions surrounded by the dashed lines.

When the PDCCHs are arranged in one symbol or two symbols from the beginning of the sub-frame, as shown in FIGS. 19(a) and 19(b), some of the CSI-RSs may be transmitted with OFDM symbol #2. FIGS. 19(a) and 19(b) are diagrams schematically illustrating other exemplary arrangements respectively corresponding to the antenna ports in the wireless transmission apparatus (base station) 700 according to the fourth embodiment. In FIGS. 19(a) and 19(b), the CSI-RSs corresponding to each antenna port are copied in the time direction so as to match the number of symbols of the PDCCH.

In FIGS. 19(a) and 19(b), each vertical axis represents a frequency and each horizontal axis represents a time. One sub-frame is formed by fourteen OFDM symbols of OFDM symbol #0 to OFDM symbol #13 shown along the horizontal axis. In regard to regions partitioning the OFDM symbols, as shown in FIGS. 19(a) and 19(b), a block A (indicated by diagonal lines) refers to a resource region with which a CRS is likely to be transmitted, a block B (indicated by dense dots) refers to a DMRS region, a block C (indicated by sparse dots) refers to a region with which a PDCCH is likely to be transmitted, and a block D (indicated by a blank) refers to a region with which the CSI-RS is likely to be arranged. In the exemplary arrangements shown in FIGS. 19(a) and 19(b), up to three cells can be multiplexed by eight antenna ports, as in FIG. 1. In the exemplary arrangements shown in FIGS. 19(a) and 19(b), a region of an OFDM symbol in which the CSI-RS corresponding to antenna port number m (where m is a natural number of 0 to 4) is arranged is referred to as a block Cm.

When the PDCCHs are arranged in one symbol or two symbols from the beginning of the sub-frame, as in FIG. 19(a), blocks $C_1$ and $C_3$ are arranged in OFDM symbol #2 and blocks $C_o$ and $C_2$ are arranged in OFDM symbol #3. That is, when the PDCCHs are arranged in one symbol or two symbols from the beginning of the sub-frame, the CSI-RSs of each antenna port are arranged in OFDM symbols #2 and #3. Since four antenna ports are used, the CSI-RSs corresponding to odd antenna port numbers are arranged in OFDM symbol #2 and the CSI-RSs corresponding to even antenna port numbers are arranged in OFDM symbol #3. In the exemplary arrangement shown in FIG. 19(a), the CSI-RS to be transmitted to another base station in the neighborhood of the own apparatus which is the target of the CoMP can be arranged in the region of the block D among the regions surrounded by the dashed lines. Further, when the PDCCHs are arranged up to three symbols from the beginning of the sub-frame, as in FIG. 19(b), the blocks $C_0$, $C_1$, $C_2$, and $C_4$ are arranged in OFDM symbol #3.

Figure 20:
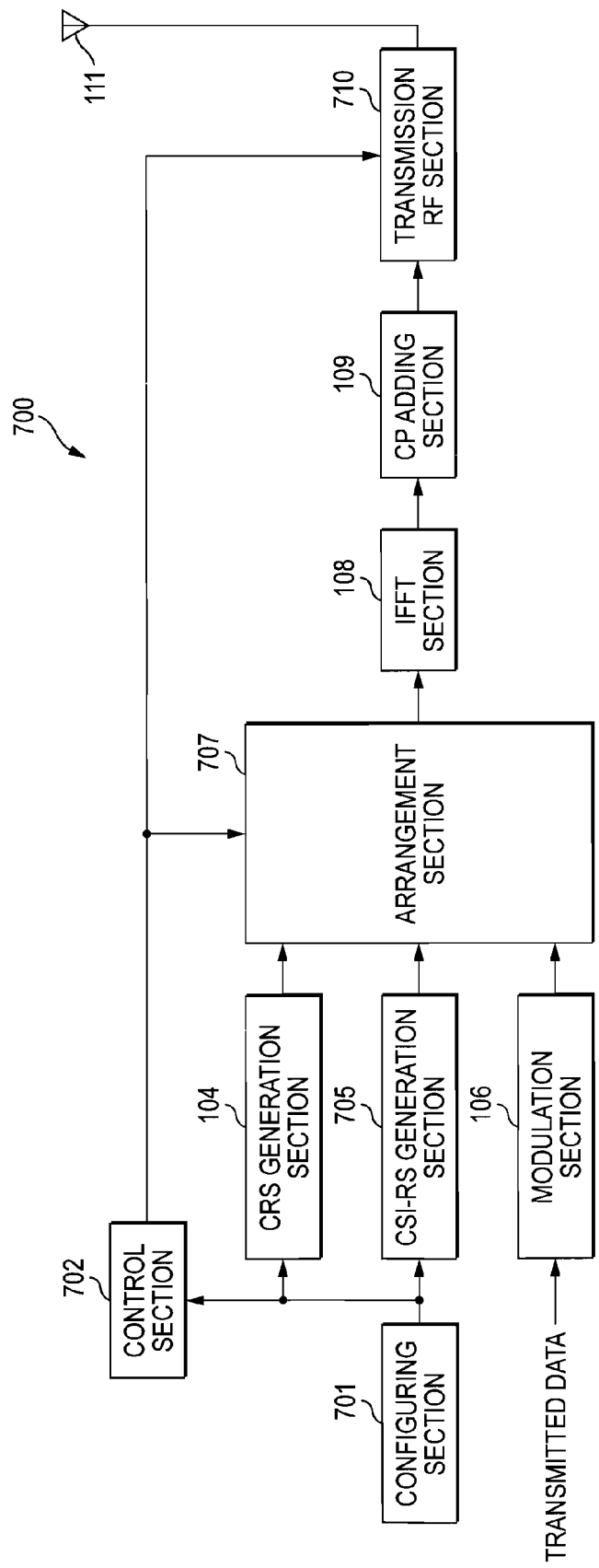
FIG. 20 is a block diagram illustrating the configuration of a base station 700.

Next, a base station 700 will be described as an example of a wireless communication apparatus according to the fourth embodiment with reference to FIG. 20. FIG. 20 is a block diagram illustrating the configuration of the base station 700. The base station 700 shown in FIG. 20 includes a configuring section 701, a control section 102, a CRS generation section 104, a CSI-RS generation section 705, a modulation section 106, an arrangement section 707, an IFFT section 108, a CP adding section 109, a transmission RF section 710, and an antenna 111. The base station 700 according to the fourth embodiment is different from the base station 100 according to the first embodiment in that the base station 700 includes the configuring section 701, the CSI-RS generation section 705, the arrangement section 707, and the transmission RF section 710 instead of the configuring section 101, the CSI-RS generation section 105, the arrangement section 107, and the transmission RF section 110. The remaining configuration is the same as the configuration of the first embodiment. In FIG. 20, the same reference numerals are given to the constituent elements common to the constituent elements in FIG. 4.

The configuring section 701 performs configuring so that the CRS corresponding to each antenna port is generated. When the CSI-RS is required to be transmitted to support the CoMP, the configuring section 701 configures "configuring information" that includes information indicating generation of the CSI-RS corresponding to each antenna port, information indicating the transmission power of the CSI-RS corresponding to each antenna port, and information indicating the arrangement of the CSI-RSs corresponding to each antenna port. Further, the configuring section 701 outputs the configuring information to the control section 702, the CRS generation section 104, and the CSI-RS generation section 705.

Based on the configuring information input from the configuring section 701, the control section 702 outputs the information indicating the arrangement of the CSI-RSs to the arrangement section 707 so that the information indicating the arrangement of the CSI-RSs corresponding to each antenna port is transmitted as a control signal of an upper layer to notify a mobile station 800 of the information indicating the arrangement of the CSI-RSs corresponding to each antenna port.

Here, the information indicating the arrangement of the CSI-RSs corresponding to each antenna port includes information indicating whether the CSI-RS corresponding to each antenna port is present, information indicating a RE in which the CSI-RS corresponding to each antenna port is arranged when the CSI-RS is present, and information indicating the transmission power of the CSI-RS corresponding to each antenna port. According to the information indicating the transmission power of the CSI-RS corresponding to each antenna port, the amplitude of the generated CSI-RS signal is adjusted to become a desired transmission power, for example, when power-boosting of increasing the transmission power of the CSI-RS than the signal of another RE is performed. Further, the information indicating the arrangement of the CSI-RS corresponding to each antenna port may not be transmitted with each sub-frame. Further, the information indicating the arrangement of the CSI-RSs may be transmitted as not the control signal of the upper layer but a control signal of a lower physical layer.

In this embodiment, the information indicating the arrangement of the CSI-RSs corresponding to each antenna port does not include information indicating a spreading code when a process such as a spreading process is performed on the CSI-RSs corresponding to each antenna port. As described above, however, the mobile station 800 is not explicitly notified of whether to spread the CSI-RSs in the time direction. The mobile station 800 is implicitly notified of whether to spread the CSI-RSs using the PCFICH.

The transmission signal power of the CSI-RS corresponding to each antenna port is controlled when the CSI-RS generation section 705 generates the CSI-RS corresponding to each antenna port. However, when the power adjustment is possible for all of the OFDM symbols, for example, when only the CSI-RSs corresponding to each antenna port are transmitted with the OFDM symbol with which the CSI-RS signal corresponding to each antenna port is transmitted, the control section 102 may output a transmission power control signal to the transmission RF section 710 to adjust the transmission signal power of the OFDM symbol with which the CSI-RS corresponding to each antenna port is transmitted based on the configuring information input from the configuring section 701.

The CRS generation section 104 generates the CRSs corresponding to each antenna port based on the configuring information input from the configuring section 701. Then, the CRS generation section 104 outputs, to the arrangement section 707, the generated CRSs corresponding to each antenna port.

The CSI-RS generation section 705 generates the CSI-RSs corresponding to each antenna port based on the configuring information input from the configuring section 701. Then, the CSI-RS generation section 705 outputs, to the arrangement section 707, the generated CSI-RSs corresponding to each antenna port.

The modulation section 106 performs channel encoding and modulating on input transmitted data (downlink data) and outputs the modulated data signals to the arrangement section 707.

The arrangement section 707 multiplexes the CRSs, which correspond to each antenna port, input from the CRS generation section 104, the CSI-RSs, which correspond to each antenna port, input from the CSI-RS generation section 105, and the data signal (that is, PDSCH) input from the modulation section 106. Further, when the control information of the upper layer used for the control section 102 to notify the mobile station of the information indicating the arrangement of the CSI-RSs corresponding to each antenna port is present, the arrangement section 707 multiplexes this control information with the CRS, the CSI-RS, and the data signal (PDSCH).

Here, the arrangement section 707 arranges (multiplexes) the CRS corresponding to each antenna port, the CSI-RS corresponding to each antenna port, and the data signal (PDSCH) in each resource block. At this time, the arrangement section 707 arranges (multiplexes) the CRS corresponding to each antenna port, the CSI-RS corresponding to each antenna port, and the data signal (PDSCH) in each resource block so that the CSI-RS corresponding to each antenna port is arranged in the OFDM symbol adjacent before and after the OFDM symbol in which the CRS corresponding to each antenna port is arranged. For example, the exemplary arrangements shown in FIGS. 18(a), 18(b), 19(a), and 19(b) can be considered as the arrangement of the arrangement section 707.

Then, the arrangement section 707 outputs the multiplexed signal to the IFFT (Inverse Fast Fourier Transform) section 108.

The IFFT section 108 performs an IFFT process on the signal input from the arrangement section 707 to obtain a time region signal. Then, the IFFT section 108 outputs the time region signal to the CP (Cyclic Prefix) adding section 109.

The CP adding section 109 adds a CP to the time region signal input from the IFFT section 108 and outputs a signal obtained by adding the CP to the transmission RF (Radio Frequency) section 110.

The transmission RF section 710 performs transmission processes, such as D/A (Digital-to-Analog) conversion, up-conversion, and amplification, on the signal input from the CP adding section 109, and then wirelessly transmits the signal subjected to the transmission processes to the mobile station 800 via the antenna 111.

The base station 700 according to the fourth embodiment transmits the CSI-RSs corresponding to each antenna port with the OFDM symbol adjacent to the OFDM symbol with which the normally transmitted CRS corresponding to each antenna port is transmitted. Therefore, it is possible to reduce the number of times the ON/OFF of the OFDM symbol is performed. Further, it is possible to reduce the distortion of the CSI-RS corresponding to each antenna port and the interference to other CSI-RSs corresponding to each antenna port caused due to the occurrence of unnecessary radio waves.

Figure 21:
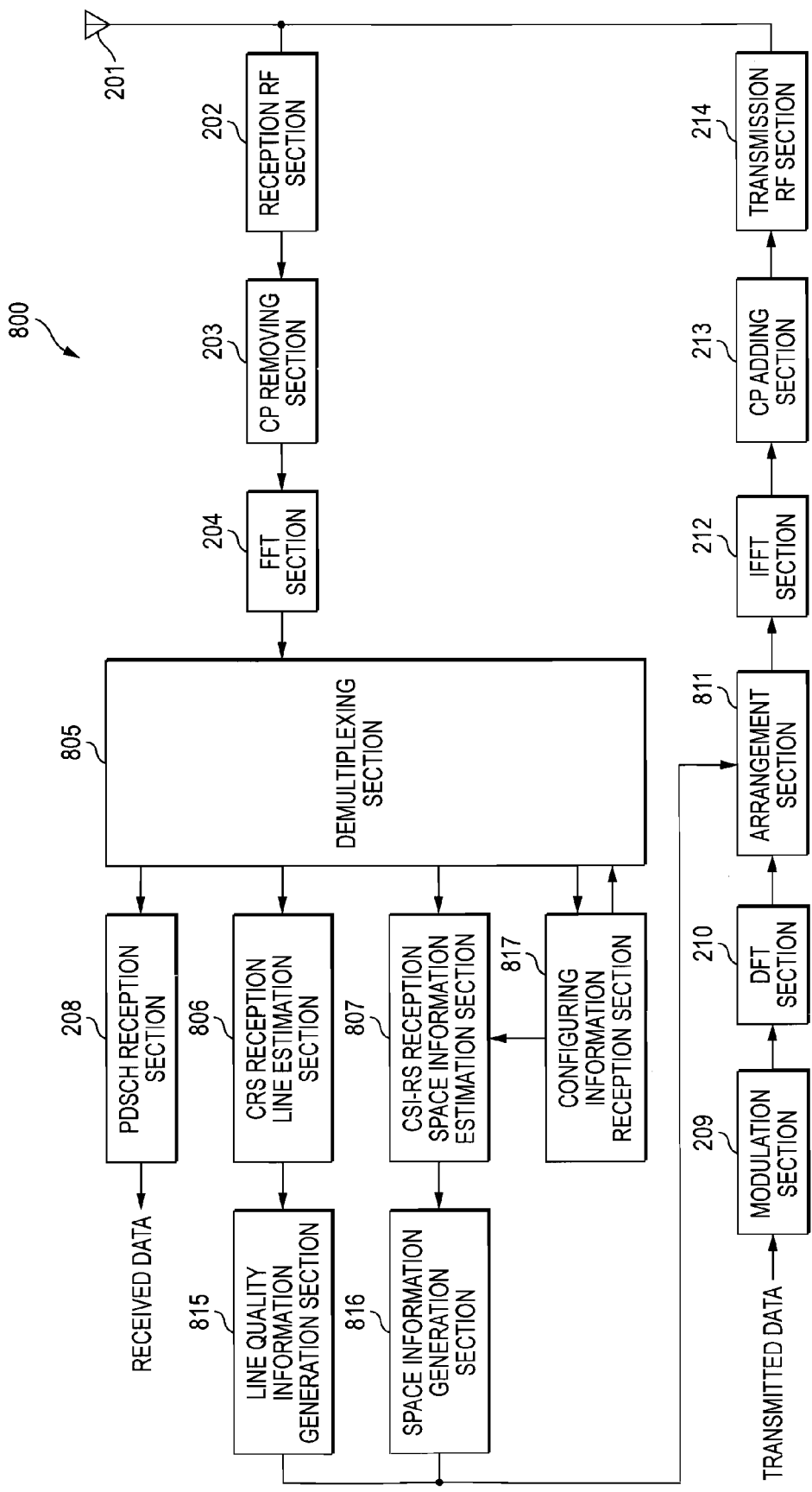
FIG. 21 is a block diagram illustrating the configuration of a mobile station 800.

Next, the configuration of the mobile station 800 communicating with the base station 700 will be described with reference to FIG. 21. FIG. 21 is a block diagram illustrating the configuration of the mobile station 800. The mobile station 800 shown in FIG. 21 includes an antenna 201, a reception RF section 202, a CP removing section 203, an FFT section 204, a demultiplexing section 805, a CRS reception line estimation section 806, a CSI-RS reception space information estimation section 807, a PDSCH reception section 208, a modulation section 209, a DFT section 210, an arrangement section 811, an IFFT section 212, a CP adding section 213, a transmission RF section 214, a line quality information generation section 815, a space information generation section 816, and a configuring information reception section 817.

The reception RF section 202, which is configured to change a reception band, changes the reception band in accordance with a reception signal. The reception RF section 202 performs reception wireless processes (down-conversion, A/D (Analog-to-Digital) conversion, and the like) on a reception wireless signal (here, an OFDM (Orthogonal Frequency Division Multiplex) signal) received via the antenna 201, and then outputs the obtained reception signal to the CP removing section 203.

The CP removing section 203 removes the CP from the reception signal input from the reception RF section 202 and outputs the signal, from which the CP is removed, to the FFT (Fast Fourier Transform) section 204.

The FFT section 204 performs an FFT process on the signal input from the CP removing section 203 to acquire a frequency region signal. Then, the FFT section 204 outputs the frequency region signal to the demultiplexing section 805.

The demultiplexing section 805 demultiplexes the frequency region signal input from the FFT section 204 into the CRS corresponding to each antenna port, the CSI-RS corresponding to each antenna port, and the data signal (that is, the PDSCH). Based on the configuring information received with the immediately previous sub-frame or the more previous sub-frame, the demultiplexing section 805 outputs the CRS corresponding to each antenna port, the CSI-RS corresponding to each antenna port, and the PDSCH to the CRS reception section 806, the CSI-RS reception section 807, and the PDSCH reception section 208, respectively. Further, the demultiplexing section 805 outputs the control signal of the upper layer including the configuring information to the configuring information reception section 817.

Here, the "configuring information" refers to information that includes the information indicating the generation of the CSI-RS corresponding to each antenna port, information indicating the transmission power of the CSI-RS corresponding to each antenna port, and information indicating the arrangement of the CSI-RSs corresponding to each antenna port. In this embodiment, the information indicating the arrangement of the CSI-RSs corresponding to each antenna port does not include information indicating a spreading code when a process such as a spreading process is performed on the CSI-RSs corresponding to each antenna port. As described above, however, the base station 700 does not explicitly notify the mobile station 800 of "whether to spread the CSI-RSs in the time direction." The base station 700 implicitly notifies the mobile station 800 of "whether to spread the CSI-RSs using the PCFICH." Further, the information indicating the arrangement of the CSI-RS corresponding to each antenna port may not be transmitted with each sub-frame. Further, the information indicating the arrangement of the CSI-RSs may be transmitted as not the control signal of the upper layer but a control signal of a lower physical layer.

In this embodiment, spreading the CSI-RSs in the time direction includes simply copying the CSI-RSs in the time direction.

The configuring information reception section 817 reads the configuring information of the CSI-RS corresponding to each antenna port from the control signal input from the demultiplexing section 805, and then outputs the read configuration information to the demultiplexing section 805. Further, the configuring information reception section 817 outputs, to the CSI-RS reception space information estimation section 807, information on a reverse-spreading code or the like used to receive and demodulate the CSI-RS corresponding to each antenna port.

The CRS reception line estimation section 806 estimates a downlink, through which the signal is transmitted from the base station 700 to the own apparatus, based on the CRS, which corresponds to each antenna port, input from the demultiplexing section 805 and outputs a line estimation value of the downlink to the line quality information generation section 815.

The line quality information generation section 815 generates line quality information to be reported to the base station 700 based on the line estimation value input from the CRS reception line estimation section 806. The "line quality information" generated here refers to, for example, CQI (Channel Quality Indicator).

The CSI-RS reception space information estimation section 807 performs space information estimation of the downlink, through which the signal is transmitted from the base station 700 to the own apparatus, based on the CSI-RS, which corresponds to each antenna port, input from the demultiplexing section 805, referring to the configuring information of the CSI-RS, which corresponds to each antenna port, input from the configuring information reception section 817. Then, the CSI-RS reception space information estimation section 807 inputs the space estimation information to the space information generation section 816.

The space information generation section 816 generates space information to be reported to the base station 700 based on the input space estimation information input from CSI-RS reception space information estimation section 807. Further, the space information estimation is performed for not only the base station 700 communicating with the own apparatus but also another base station in the neighborhood of the own apparatus which is the target of the CoMP.

The PDSCH reception section 208 demodulates the PDSCH input from the demultiplexing section 805 to acquire the received data.

The modulation section 209 performs channel encoding and modulating on the input transmitted data (upstream data) and outputs the modulated data signal to the DFT (Discrete Fourier Transform) section 210.

The DFT section 210 performs the FFT process on the data signal input from the modulation section 209 to acquire a frequency region signal. The DFT section 210 outputs the frequency region signal to the arrangement section 811.

The arrangement section 811 arranges the line quality information input from the line quality information generation section 815, the space information input from the space information generation section 816, and the frequency region signal input from the DFT section 210 in upstream resource blocks.

The IFFT section 212 performs an IFFT process on the frequency region signal input from the arrangement section 811 to acquire a time region signal. Then, the IFFT section 212 outputs the time region signal to the CP adding section 213.

The CP adding section 213 adds a CP to the time region signal input from the IFFT section 212 and outputs the signal, to which the CP is added, to the transmission RF section 214.

The transmission RF section 214 performs transmission processes, such as D/A (Digital-to-Analog) conversion, up-conversion, and amplification, on the signal input from the CP adding section 213 and wirelessly transmits the signal subjected to the transmission processes to the base station 700 via the antenna 201.

The mobile station 800 according to the fourth embodiment demultiplexes the CSI-RSs corresponding to each antenna port from the signal which has been transmitted from the base station 700 and in which the CSI-RSs corresponding to each antenna port are arranged in the OFDM symbols continuous to the OFDM symbol with which the normally transmitted CRS corresponding to each antenna port is transmitted, and then performs the space information estimation of the downlink based on the CSI-RSs corresponding to each antenna port. Therefore, the space information to be reported to the base station 700 or a base station in the neighborhood of the target of the CoMP can be generated based on the CSI-RSs with no distortion corresponding to each antenna port.

In this embodiment, the number of times the transmission signal power is turned on and off can be reduced based on the temporal continuity of the signal with the PDCCH.

In this embodiment, even when the reference signal of each antenna port is transmitted by another antenna and another amplifier, the number of times each amplifier is switched between ON and OFF can be reduced by copying the CSI-RSs corresponding to each antenna port in the time direction and arranging the CSI-RSs between the OFDM symbols in which the CRS of each antenna port is arranged or in the OFDM symbol continuous to the OFDM symbol in which the CRS of each antenna port is arranged.

In this embodiment, the plurality of CSI-RSs can be encoded and multiplexed by spreading the CSI-RSs and multiplying an orthogonal code. Accordingly, the resources necessary for the CSI-RSs can be maintained to be the same as the resources before the spreading. Further, even when all of the spread CSI-RSs may not be arranged in the OFDM symbols adjacent to the CRS, it is possible to reduce the influence of the change in the signal power caused due to the reverse spreading.

In the embodiments described above, the methods of arranging the CSI-RSs have been described, but the invention is not limited to the CSI-RSs. The embodiments described above may be applied to signals (a reference signal, a data signal, a control signal, and the like) that may considerably deteriorate due to distortion of AP. Further, the CRS, PDCCH, and the like have been exemplified as the signal included in a symbol adjacent when the CSI-RSs are arranged. However, the above-mentioned advantages can be obtained, even when the symbol is adjacent to a symbol that includes other signals.

Each functional block used in the description of each embodiment is generally realized as an LSI which is an integrated circuit. The functional blocks may be individually configured as a single chip, or some or all of the functional bocks may be configured as a single chip. Here, the term, an LSI is used, but the terms, an IC, a system LSI, a super LSI, an ultra LSI may be used depending on a difference in the integration degree.

A method of forming an integrated circuit is not limited to the LSI, but may be realized by a dedicated circuit or a general processor. After the LSI is manufactured, a programmable FPGA (Field Programmable Gate Array) or a reconfigurable processor capable of reconfiguring the connection or setting of circuit cell inside an LSI may be used.

When an integrated circuit technology for substituting the LSI with another technology advanced or derived from the semiconductor technology is developed, the functional blocks may, of course, be integrated using this technology. Biotechnologies can be adapted.

In the embodiments described above, the antenna has been described, but the invention is likewise applicable to an antenna port. The antenna port refers to a logical antenna configured by a single physical antenna or a plurality of physical antennas. That is, the antenna port does not necessarily refer to a single physical antenna and may refer to an array antenna or the like configured by a plurality of antennas. For example, in LTE, there is no rule how many physical antennas an antenna port configure an antenna port. A base station is specified as the minimum unit that can transmit different reference signals. Further, the antenna port is specified as the minimum unit that multiplies a weight of a precoding vector.

The invention has been described in detail and with reference to the specific embodiments, but it should be apparent to those skilled in the art that various modifications or corrections are made without departing from the spirit and scope of the invention.

Priority is claimed on Japanese Patent Application No. 2010-087197, filed on Apr. 5, 2010, the content of which is incorporated herein by reference.

INDUSTRIAL APPLICABILITY

The wireless communication apparatus and the wireless communication method according to the invention have the advantages of reducing the distortion of the CSI-RS and the interference to other CSI-RS. Thus, the wireless communication apparatus is useful as a communication apparatus or the like.

REFERENCE SIGNS LIST

100, 300, 500, 700 base station
101, 301, 501, 701 configuring section
105, 305, 505, 705 CSI-RS generation section
107, 307, 507, 707 arrangement section
110, 310, 510, 710 transmission RF section
200, 400, 600, 800 mobile station
205, 405, 605, 805 demultiplexing section
207, 407, 607, 807 CSI-RS reception space information estimation section
216, 416, 616, 816 space information generation section
217, 417, 617, 817 configuring information reception section

The invention claimed is:

1. A wireless communication apparatus comprising:
   a reception section that receives a signal including a CSI-RS and CSI-RS arrangement information indicating that the CSI-RS is arranged in a single OFDM symbol or a plurality of consecutive OFDM symbols continuous to an OFDM symbol in which a signal other than the CSI-RS is arranged;
   a demultiplexing section that demultiplexes the CSI-RS from the signal based on the CSI-RS arrangement information received by the reception section; and
   a space information generation section that generates a space estimation information of a line between the own wireless communication apparatus and another communication apparatus communicating with the own wireless communication apparatus from the CSI-RS.

2. A mobile apparatus comprising the wireless communication apparatus according to claim 1.

* * * * *